US008488593B2

(12) United States Patent
Chan et al.

(10) Patent No.: US 8,488,593 B2
(45) Date of Patent: Jul. 16, 2013

(54) APPARATUS AND SYSTEM FOR CONTROLLING SIGNAL FILTERING

(75) Inventors: Frank Siu Hong Chan, Scarborough (CA); David Charles Grainger, London (CA)

(73) Assignee: BCE Inc., Verdun, Quebec (CA)

( * ) Notice: Subject to any disclaimer, the term of this patent is extended or adjusted under 35 U.S.C. 154(b) by 1404 days.

(21) Appl. No.: 12/095,395

(22) PCT Filed: Dec. 27, 2006

(86) PCT No.: PCT/CA2006/002139
§ 371 (c)(1),
(2), (4) Date: May 29, 2008

(87) PCT Pub. No.: WO2008/028272
PCT Pub. Date: Mar. 13, 2008

(65) Prior Publication Data
US 2008/0298346 A1     Dec. 4, 2008

(30) Foreign Application Priority Data
Sep. 8, 2006  (CA) ..................................... 2559133

(51) Int. Cl.
*H04L 12/66*          (2006.01)
(52) U.S. Cl.
USPC ............................................. 370/352; 725/99
(58) Field of Classification Search
USPC .................... 725/99, 125, 119, 120; 370/260, 370/399.01; 379/390.02
See application file for complete search history.

(56) References Cited

U.S. PATENT DOCUMENTS

| | | | | |
|---|---|---|---|---|
| 5,410,343 A | * | 4/1995 | Coddington et al. | 725/99 |
| 5,815,794 A | * | 9/1998 | Williams | 725/125 |
| 5,838,665 A | * | 11/1998 | Kahn et al. | 370/260 |

(Continued)

FOREIGN PATENT DOCUMENTS

| | | |
|---|---|---|
| CA | 2559130 A1 | 3/2008 |
| CA | 2559422 A1 | 3/2008 |

(Continued)

OTHER PUBLICATIONS

International Search Report for corresponding International Application No. PCT/CA2006/002139 mailed on Jun. 12, 2007.

*Primary Examiner* — Luat Phung
*Assistant Examiner* — Parth Patel

(57) ABSTRACT

According to embodiments of the present invention, there is provided an apparatus and system for controlling signal filtering. According to some non-limiting embodiments, a selective filtering apparatus is provided. The selective filtering apparatus comprises an input interface connectable to a source of a composite signal within a first frequency range and a filtering device, coupled to the input interface. The filtering device comprises a filter and an output interface, the filter being operable to filter the composite signal and output an output signal within a second frequency range, the second frequency range being a subset of the first frequency range; the output interface being connectable to at least a portion of an in-premises telephone wiring. The selective filtering apparatus further comprises a triggering module being operable to cause the output interface to selectively output one of the output signal and the composite signal responsive to detection of a triggering event.

38 Claims, 11 Drawing Sheets

U.S. PATENT DOCUMENTS

| | | | |
|---|---|---|---|
| 6,075,784 A | 6/2000 | Frankel et al. | |
| 6,181,715 B1 | 1/2001 | Phillips et al. | |
| 7,458,092 B1 * | 11/2008 | Parker et al. | 725/120 |
| 2001/0021249 A1 * | 9/2001 | Aschrafi | 379/390.02 |
| 2003/0033608 A1 * | 2/2003 | Chang et al. | 725/119 |
| 2004/0101130 A1 * | 5/2004 | Shi et al. | 379/399.01 |

FOREIGN PATENT DOCUMENTS

| | | |
|---|---|---|
| KR | 568192 B1 * | 4/2006 |
| WO | 98/02985 | 1/1998 |
| WO | 00/64105 | 10/2000 |
| WO | 01/60082 A1 | 8/2001 |

* cited by examiner

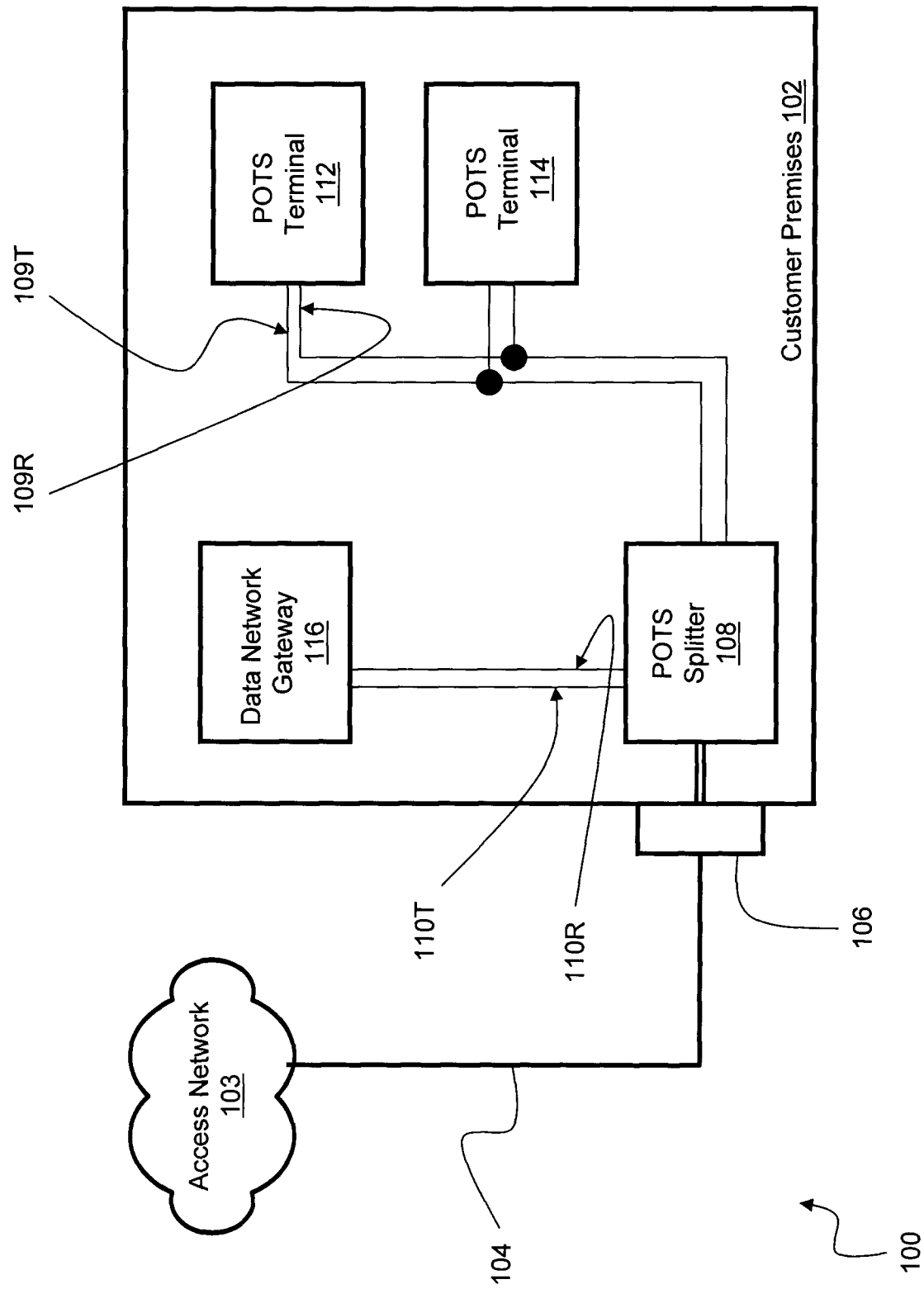

APPARATUS AND SYSTEM FOR CONTROLLING SIGNAL FILTERING

RELATED APPLICATIONS DATA

This patent application is related to a patent application entitled "METHOD AND SYSTEM FOR BRIDGING COMMUNICATION SIGNALS" to Chan et al. being filed concurrently herewith and having application Ser. No. 12/440,343.

This patent application is related to a patent application entitled "METHOD, SYSTEM AND APPARATUS FOR CONTROLLING A NETWORK INTERFACE DEVICE" to Chan being filed concurrently herewith and having application Ser. No. 11/997,223.

FIELD OF THE INVENTION

This invention relates to the field of telecommunications in general and, more specifically, to an apparatus and system for controlling signal filtering.

BACKGROUND OF THE INVENTION

In the early days of network computing, users relied on analog dial-up modems to establish a communication session with a remote resource via the Public Switched Telephone Network (PSTN). The analog dial-up modems were operable to establish the communication session in much the same manner as other telephone equipment (such as fax machines and the like) established a communication session with a destination device. Dial-up modems were operable to establish an unreliable and bandwidth-limited connection. As time progressed, service providers started offering services (such as voice-over-IP communication, video-over-IP, network gaming, music and video downloading services and the like) that required a more reliable connection and were much more bandwidth-intensive. Several high speed access solutions are currently present on the market, one of them being xDSL-based access (which includes Asynchronous Digital Subscriber Line (ADSL), Very High Bit-rate DSL (VDSL), Symmetric DSL (SDSL), Rate-adaptive DSL (RADSL) and the like).

One of the advantages of many of the xDSL technologies (including ADSL) is that they can carry lower frequency voice signals and higher frequency data signals over the same telephone line. The voice signals, referred to herein as Plain Old Telephone Service (POTS) signals, are typically transmitted over a frequency band from approximately 100 Hz to about 4 kHz. Accordingly, traditional POTS equipment at the customer premises (such as POTS phones, answering machines, fax machines, analog modems and the like) can be used to transmit and receive POTS signals. At the same time, the data signals (or "DSL data signals" as they are referred to herein below) are typically transmitted at higher frequencies. For example, the ADSL data signals are transmitted upstream over a frequency band from about 32 kHz to about 134 kHz, and received downstream over a frequency band from about 203 KHz to about 1.2 MHz.

The xDSL technologies are prone to some known problems, such as distance limitations. Moreover, due to the fact that the xDSL technologies utilize lower frequency bands for POTS signals and higher frequency bands for DSL data signals, the composite full spectrum signal has to be separated at some point in the telephone line both in a service provider's central office and a customer premises. Otherwise, the high frequency signals will cause a humming noise to be present when a regular telephone conversation occurs. Generally speaking, in the customer premises, the requirement for separating the composite full spectrum signal into the voice-band signal and the DSL-band data signal has been addressed by use of a POTS microfilter or a POTS splitter. The POTS microfilter, which is sometimes also referred to as a distributed filter, a line filter or a phone line filter, is fitted to every POTS termination point (usually mounted between the wall RJ-11 jack and a plug leading to the POTS termination point). The POTS microfilter is operable to pass a lower-frequency signal and to block all signals above a certain frequency (a typical POTS microfilter blocks all signals over 40 kHz). Even though the use of POTS microfilters has proven to be successful for in-home systems providing access to standard sources of data (such as, for example, the Internet), bandwidth losses of approximately 2 to 3 Mbits/sec attributable to POTS microfilters and the in-home telephone network have proven to negatively affect performance of in-home systems providing access to sources of data requiring higher bandwidth (such as, for example, a source of video-over-IP data).

The POTS splitter, on the other hand, is typically fitted at a demarcation point where it diverges data and voice lines and, therefore, separates POTS signals from DSL-band data signals. The POTS splitters are typically installed by the service provider and allows for the installation of a so-called "home run" (i.e. a dedicated point-to-point) cable to "light up" a particular jack in the subscriber premises with the full spectrum signal, containing the DSL data signals, while "lighting up" all other jacks of the subscriber premises with filtered, POTS signals only. Even though use of POTS splitters has mitigated some problems associated with the use of POTS microfilters (such as, for example, reducing bandwidth losses), the POTS splitter approach suffers from certain problems as well. For example, if a subscriber moves or is otherwise no longer desirous of using the POTS splitter, the service provider has to dispatch a technician to uninstall the POTS splitter. This results in an unnecessary cost being incurred by the service provider, which in most cases has to be absorbed by the service provider. In today's competitive environment prevalent in the telecommunications sector, service providers are on a constant look-out to decrease operating costs and, specifically, to decrease costs associated with "truck rolls", i.e. costs associated with dispatching technicians to customer premises.

SUMMARY OF THE INVENTION

According to a first broad aspect of the present invention, there is provided a selective filtering apparatus. The selective filtering apparatus comprises an input interface connectable to a source of a composite signal within a first frequency range; a filtering device, coupled to the input interface, comprising a filter and an output interface, the filter being operable to filter the composite signal and output an output signal within a second frequency range, the second frequency range being a subset of the first frequency range; the output interface being connectable to at least a portion of an in-premises telephone wiring. The selective filtering apparatus further comprises a triggering module being operable to cause the output interface to selectively output one of the output signal and the composite signal responsive to detection of a triggering event.

According to a second broad aspect of the present invention, there is provided a selective filtering apparatus. The selective filtering apparatus comprises an input interface connectable to a source of a composite signal within a first frequency range; and a filter coupled to the input interface operable to filter the composite signal and output an output signal within a second frequency range, the second frequency range being a subset of the first frequency range. The selective filtering apparatus further comprises an output interface being connectable to at least a portion of an in-premises telephone wiring; the output interface being operable to selectively be coupled to one of at least a portion of the filter and the input interface responsive to detection of a triggering event; whereby responsive to the triggering event, the output interface is operable to selectively output one of the output signal and the composite signal to the at least a portion of the in-premises telephone wiring.

According to a third broad aspect of the present invention there is provided a selective filtering apparatus. The selective filtering apparatus comprises an input interface connectable to a source of a composite signal within a first frequency range; and an active filter coupled to the input interface, the active filter being operable to filter the composite signal and to output an output signal within a second frequency range when in a first operational state and output the composite signal when in a second operational state, the second frequency range being a subset of the first frequency range. The selective filtering apparatus further comprises a triggering module being operable to cause the active filter to enter one of the first and second operational states responsive to detection of a triggering event, whereby responsive to detection of the triggering event, the triggering module is operable to control the active filter to selectively output one of the output signal and the composite signal.

According to another broad aspect of the present invention, there is provided a system. The system comprises means for connecting to a source of a composite signal within a first frequency range; means for filtering the composite signal so as to generate an output signal within a second frequency range, the second frequency range being a subset of the first frequency range; means for outputting signals connectable to at least a portion of an in-premises telephone wiring. The system further comprises means for triggering operable to cause said means for outputting signals to selectively output one of the output signal and the composite signal responsive to detection of a triggering event.

These and other aspects and features of the present invention will now become apparent to those skilled in the art upon review of the following description of specific embodiments of the invention in conjunction with the accompanying drawings.

BRIEF DESCRIPTION OF THE DRAWINGS

Embodiments of the present invention are described with reference to the following figures, in which:

FIG. 1A is a schematic diagram representing various components of a non-limiting embodiment of a system for controlling POTS splitter filtering function;

Figure 1B:
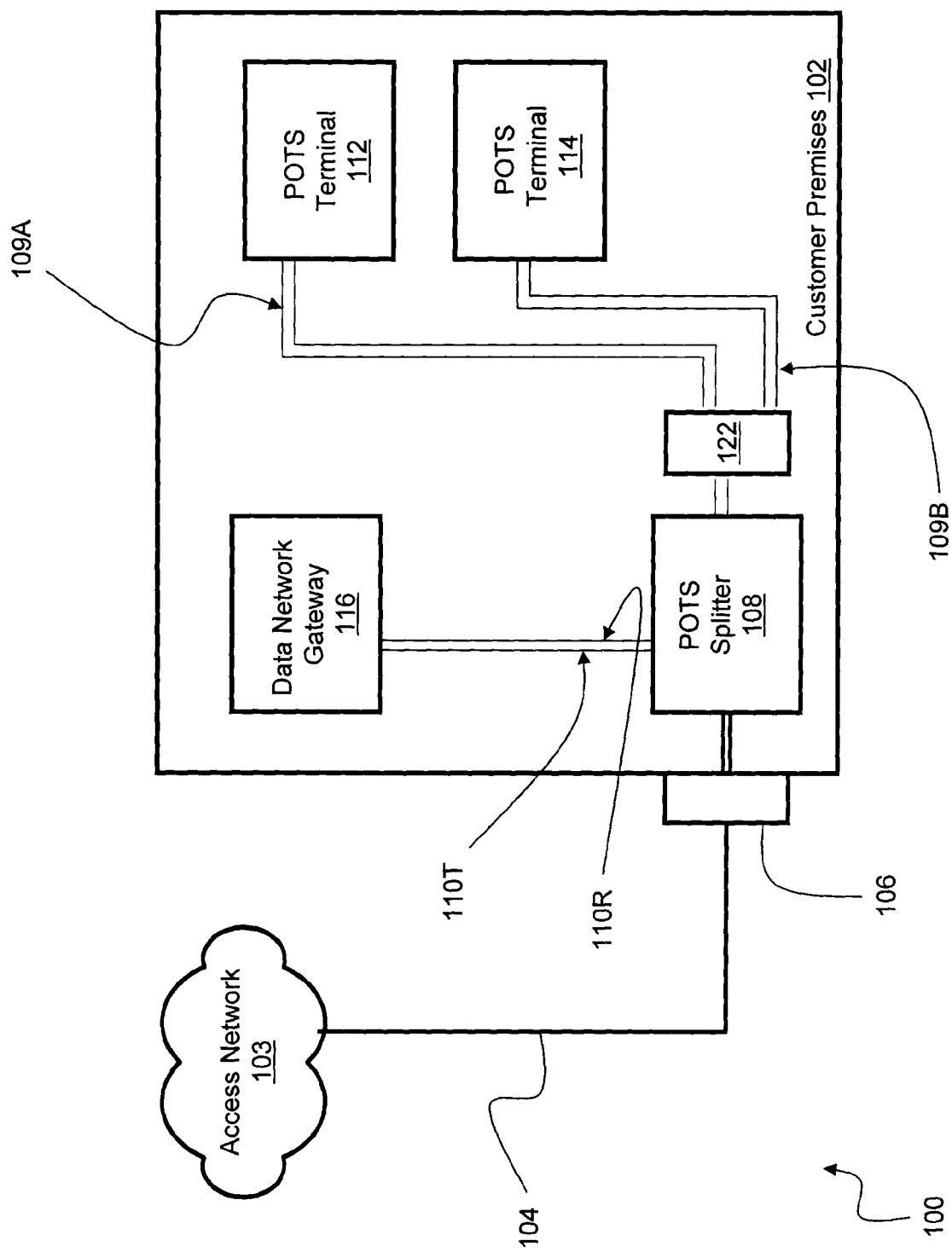
FIG. 1B is a schematic diagram representing various components of another non-limiting embodiment of a system for controlling POTS splitter filtering function.

It is to be expressly understood that the description and drawings are only for the purpose of illustration of certain embodiments of the invention and are an aid for understanding. They are not intended to be a definition of the limits of the invention.

DETAILED DESCRIPTION OF THE EMBODIMENTS

FIG. 1A depicts a non-limiting embodiment of a system 100 for controlling signal filtering. The system 100 comprises a customer premises 102, which can comprise a residence, a vacation property, a business establishment, an office and the like. The customer premises 102 is connected to an access network 103 via an access connection 104. In some embodiments of the present invention, the access network 103 can comprise an ADSL-based access network. In alternative embodiments of the present invention, the access network 103 can comprise any other suitable type of xDSL-based access network. In these non-limiting embodiments of the present invention, the access network 103 can comprise several elements, such as one or more of a DSL Access Multiplexer (DSLAM), one or more units with POTS splitter functionality, SONET/SDH Network Terminations (NTs) and the like; all of which are known to those of skill in the art and, as such, have been omitted from FIG. 1A for the sake of simplicity. In these non-limiting embodiments of the present invention, the access connection 104 can comprise a standard twisted pair of copper wires, which is sometimes referred to by those of skill in the art as a "twisted pair".

In an alternative non-limiting embodiment of the present invention, the access network 103 can be based on Fiber-to-the-Node architecture, Fiber-to-the-Curb architecture, Fiber-to-the-Neighbourhood architecture, Fiber-to-the-Home or any other suitable arrangement. In further alternative non-limiting embodiments of the present invention, the access network 103 can comprise a cable network, a wireless network, a Power Line Communication (PLC) network and the like. For the avoidance of doubt, the access network 103 can comprise any suitable type of access network as long as at least a portion of an in-home telephone wiring (i.e. telephone wiring within the customer premises 102) is used to simultaneously convey the DSL data signal and the POTS signal. Irrespective of the type of the access network 103, the access network 103 is operable to provide connectivity between the customer premises 102 and a service provider backbone network (not depicted).

In these alternative non-limiting embodiments of the present invention, another type of the access connection 104 can be used, for example, in a non-limiting scenario where the access network 103 is implemented using a fiber-to-the-home architecture, the access connection 104 can comprise an optical connection. In an alternative non-limiting embodiment of the present invention, the access connection 104 can be a wireless link, such as a WiFi-based connection, a WiMax-based connection, CDMA-based connection, TDMA-based connection, GSM-based connection and the like. In yet another alternative embodiment of the present invention, the access connection 104 can comprise a cable or a portion of a Power Line Communication system. One skilled in the art could contemplate other suitable types of access connection 104 that could be used.

It should be noted that in some embodiments of the present invention, connected to the customer premises 102 can be a number of additional access connections coupled to the access network 103 (or another access network), which have been omitted from FIG. 1A for the sake of simplicity. In some embodiments of the present invention, the access connection 104 is operable to transmit a full-spectrum signal, comprising a lower frequency POTS signal and a higher frequency data signal between the access network 103 and the customer premises 102. This full-spectrum signal is sometimes referred to by those of skill in the art as a DSL or xDSL signal.

The access connection 104 can terminate at a Network Interface Device 106 (which is referred to herein below as "NID 106"), which in some embodiments of the present invention can be installed on an external wall of the customer premises 102. In an alternative non-limiting embodiment of the present invention, the NID 106 can be installed within the customer premises 102. In yet another alternative embodiment of the present invention, the NID 106 can be installed outside of the customer premises 102 proximate to the external wall of the customer premises 102. Irrespective of where the NID 106 is installed, the NID 106 can serve as a demarcation point between a service provider's portion of the architecture (typically, the access network 103 and the access connection 104) and a customer's portion of the architecture (typically, in-home wiring located within the customer premises 102). It should be noted that in some embodiments of the present invention, the NID 106 can be omitted from the system 100 of FIG. 1A.

The system 100 further comprises a POTS splitter 108. In some non-limiting embodiments of the present invention, the POTS splitter 108 can be connected to the NID 106. In an alternative non-limiting embodiment of the present invention, the POTS splitter 108 can be integrated with the NID 106. Other variations are, of course, also possible. The functionality of the POTS splitter 108 will be explained in greater detail herein below. For the time being, suffice it to say that the POTS splitter 108 is operable to split the composite, full spectrum signal to provide a voice interface and a data interface. The data interface is operable to convey the full spectrum signal, i.e. the signal having both the POTS signal and the DSL data signal. The voice interface is operable to convey filtered, POTS only signal. More specifically, in some embodiments of the present invention, the POTS splitter 108 can be operable to receive a full spectrum signal from the access connection 104 and to output the received full spectrum signal as follows:

(a) a first signal transmitted via a first twisted pair comprising a tip wire 109T and a ring wire 109R (the first twisted pair being referred to herein below as a line 109), coupled to the POTS splitter 108, the first signal comprising a filtered POTS signal or, put another way, a filtered signal which comprises a subset of the full spectrum signal with the higher frequencies data signals being filtered; and (b) a second signal transmitted via a second twisted pair comprising a tip wire 110T and a ring wire 110R (the second twisted pair being referred to herein below as a line 110) coupled to the POTS splitter 108, the second signal comprising the full spectrum signal, i.e. the signal having both the low frequency POTS signal and a higher frequency data signal.

In some embodiments of the present invention, the POTS splitter 108 can comprise an "active filter" and, as such, may require power to perform various functions to be described herein below. In these non-limiting embodiments of the present invention, the POTS splitter 108 may be connected to an in-home electrical network (not depicted).

Alternatively, the POTS splitter 108 may be coupled to an alternative source of power (internal or external to the customer premises 102). Naturally, in other non-limiting embodiments of the present invention, the POTS splitter 108 may be a "passive splitter" and, as such, may not require power to perform various functions to be described herein below.

In the specific non-limiting embodiment depicted in FIG. 1A, connected to the line 109 can be a number of POTS devices, such as a POTS terminal 112 and a POTS terminal 114. Naturally, a number of additional POTS devices may be connected to the line 109 in alternative non-limiting embodiments of the present invention. The POTS terminal 112 and the POTS terminal 114 are just two examples of such devices and can be embodied in a POTS phone, a POTS cordless phone, a fax machine, an answering machine, an analog dial-up modem, an alarm system and the like. In the specific non-limiting embodiment of the present invention depicted in FIG. 1A, the POTS terminal 112 and the POTS terminal 114 can be connected in series, a configuration sometimes referred to by those of skill in the art as a "daisy chain" configuration.

In an alternative non-limiting embodiment of the system 100, depicted in FIG. 1B, the POTS terminal 112 and the POTS terminal 114 can be coupled to the POTS splitter 108 in parallel via a line 109A and a line 109B respectively, each of the lines 109A, 109B comprising respective tip and ring wires. In these non-limiting embodiments of the present invention, the line 109A and line 109B can be coupled to the POTS splitter 108 via a bridge 122. In a specific non limiting example of the present invention, the bridge 122 is embodied in a device referred to by those of skill in the art as "66 blocks". However, it should be understood that the bridge 122 can be embodied in any suitable terminal block, punch down block, BIX block and the like. This arrangement is referred to sometimes by those of skill in the art as a "star" configuration. One skilled in the art will appreciate that in some embodiments of the present invention, a combination of the daisy chain and the star configurations can be used within the same customer premises 102.

Returning to FIG. 1A, connected to the line 110 can be a data network gateway 116. In some embodiments of the present invention, the data network gateway 116 can comprise a wireless access point with a built-in modem and router. In these embodiments of the present invention, connected to the data network gateway 116 can be a number of data terminals via a wireless or a wired connection, such as a desktop computer, a lap top, a video set-top box, a gaming apparatus, a VoIP phone and the like (all of these have been omitted from FIG. 1A for the sake of simplicity). In an alternative non-limiting embodiment of the present invention, the data network gateway 116 can comprise a modem. In these embodiments of the present invention, connected to the data network gateway 116 can be a router and/or a wireless access point. In an alternative non-limiting embodiment of the present invention, a data device can be coupled directly to the data network gateway 116.

Naturally, if it is desired to connect a POTS terminal to the line 110, one may do so by deploying a distributed POTS microfilter (not depicted). As is known to those of skill in the art, a typical POTS microfilter comprises a low frequency pass filter and will only pass through lower frequency signals (typically, voice-band frequencies), effectively filtering out higher frequency data signals.

Alternative architecture of a system for controlling signal filtering will now be described with reference to FIG. 1C, which depicts a non-limiting embodiment of a system 100'. System 100' can be substantially similar to the system 100 of FIG. 1A and, as such, like elements are depicted with like numerals. In the specific non-limiting embodiments depicted in FIG. 1C, the access connection 104 can terminate at an Enhanced Network Interface Device, which is referred to herein below as "enhanced NID" 140. The functionality of the enhanced NID 140 will be described in greater detail herein below, but for the time being suffice it to say that the enhanced NID 140 can be a demarcation point between the access network 103 and the customer premises 102. The enhanced NID 140 (or a portion thereof) is operable to split the composite, full spectrum signal to provide a voice interface and a data interface. The data interface is operable to convey a data signal retrieved from the full spectrum signal (i.e. a signal processed by an xDSL transceiver, sometimes referred to as an "xDSL Modem"). The voice interface is operable to convey filtered, POTS only signal. More specifically, in some embodiments of the present invention, the enhanced NID 140 can be operable to receive a full spectrum signal from the access connection 104 and to output the received full spectrum signal as follows:

(a) a first signal transmitted via the twisted pair comprising the tip wire 109T and the ring wire 109R, coupled to the enhanced NID 140, the first signal comprising a filtered POTS signal or, put another way, a filtered signal which comprises a subset of the full spectrum signal; and
(b) a second signal transmitted via a line 142 coupled to the enhanced NID 140, the second signal comprising the data signal extracted from the full spectrum signal.

Connected to the line 142 can be a number of data devices, such as, but not limited to, a desktop computer, a lap top, a video set-top box, a gaming apparatus, a VoIP phone and the like. An example of such data devices has been depicted in FIG. 1C as a data device 130. In some non-limiting embodiments of the present invention, the line 142 can comprise an Ethernet cable. In an alternative non-limiting embodiment of the present invention, the line 142 can comprise a Category 5 cable. In yet another non-limiting embodiment of the present invention, the line 142 can comprise a wireless link. In yet further non-limiting embodiments of the present invention, the line 142 can be embodied in a coaxial cable. Another alternative non-limiting implementation of the line 142 comprises a portion of the in-home electrical network (not depicted), commonly referred to as Power Line Communication (PLC) system. In some non-limiting embodiments of the present invention the line 142 may be embodied in what is referred to as a "home run", i.e. a dedicated data connection between the enhanced NID 140 and the aforementioned data device 130. One skilled in the art will appreciate that other types of line 142 can be used.

Figure 2A:
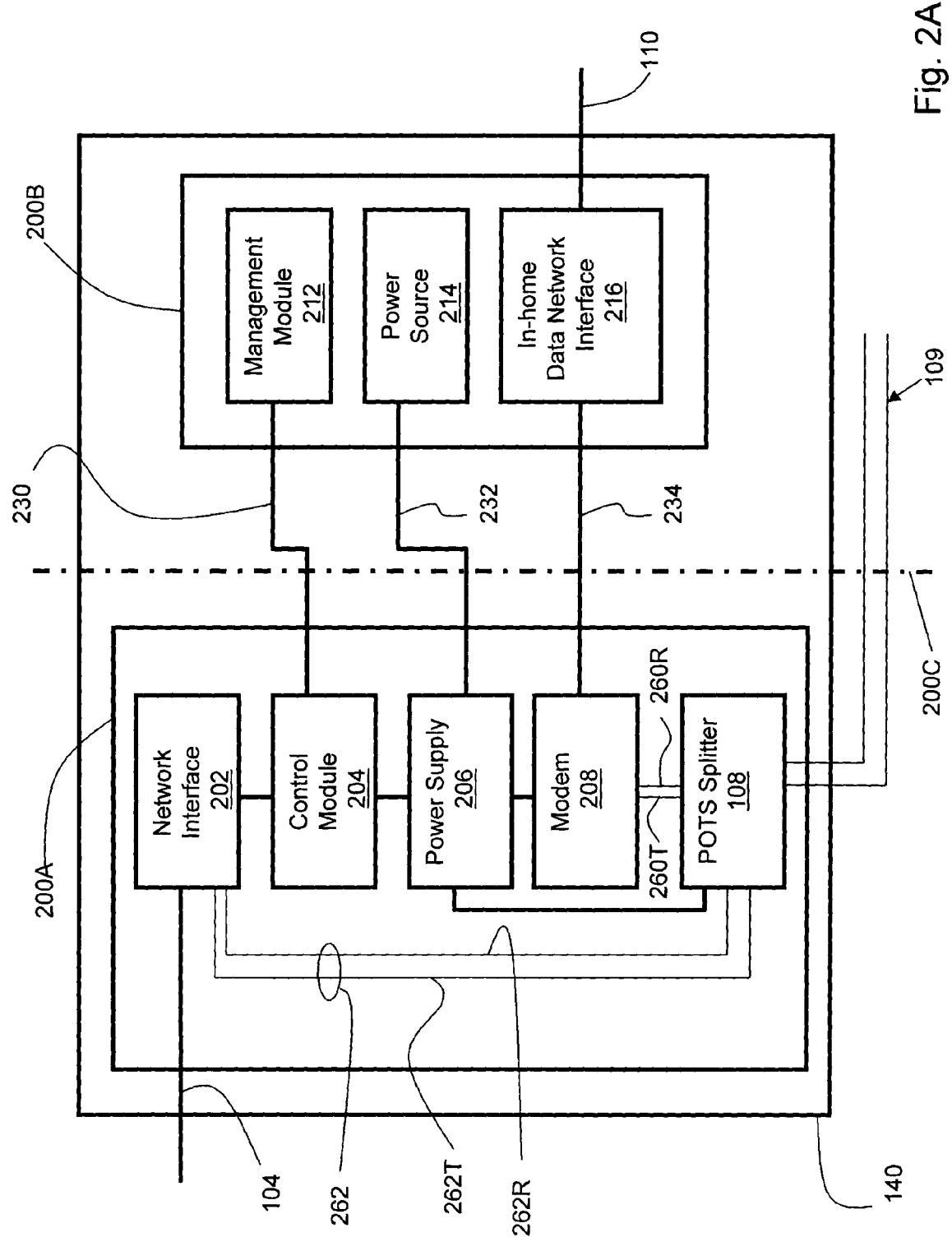
FIG. 2A is a schematic diagram representing a non-limiting embodiment of an enhanced Network Interface Device of the system of FIG. 1C.

In some non-limiting embodiments of the present invention, the enhanced NID 140 can comprise several functional entities. With reference to FIG. 2A, a first non-limiting embodiment of the enhanced NID 140 will now be described. In the specific non-limiting embodiment depicted in FIG. 2A, the enhanced NID 140 can comprise two functional entities: an external network interface portion 200A and an in-home network interface portion 200B.

In a first specific non-limiting embodiment, the external network interface portion 200A and the in-home network interface portion 200B can be embodied in respective, physically separate apparatuses. In a first specific non-limiting example of this embodiment, the external network interface portion 200A can be installed on an outside wall of the customer premises 102, while the in-home network interface portion 200B can be installed inside of the customer premises 102. In a second non-limiting example of this embodiment, both the external network interface portion 200A and the in-home network interface portion 200B can be installed on the outside wall of the customer premises 102. In a third non-limiting example if this embodiment, both the external network interface portion 200A and the in-home network interface portion 200B can be installed inside the customer premises 102. In a fourth non-limiting example of this embodiment, the external network interface portion 200A can be installed outside of the customer premises 102 (such as for example, in close proximity to the customer premises 102, or remotely from the customer premises 102, such as in a central office associated with the service provider who manages the access network 103). In this fourth non-limiting example, the in-home network interface portion 200B can be installed on the outside or the inside of the customer premises 102. A "demarcation line" between the external network interface portion 200A and the in-home network interface portion 200B has been depicted in a broken line 200C in FIG. 2A.

In a second non-limiting embodiment of the present invention, the external network interface portion 200A and the in-home network interface portion 200B can be embodied in an integrated apparatus and can be mounted onto the external wall of the customer premises 102, outside in close proximity to the customer premises 102 or inside of the customer premises 102.

The external network interface portion 200A can comprise a network interface 202. The network interface 202 can be configured to connect to the aforementioned access connection 104. In a first non-limiting example of the present invention, the network interface 202 can comprise a female jack configured to receive a male jack to which the access connection 104 terminates. Examples of such jack include, but are not limited to, a female RJ-11 jack, a female RJ-14 jack, other types of female RJ jacks, a female jack for receiving a male jack to which a Category 5 cable terminates and the like. In a second non-limiting example of the present invention, the network interface 202 can comprise a first engaging element and a second engaging element for engaging a tip wire and a ring wire of the access connection 104 respectively by means of screws, alligator clips and the like. In alternative non-limiting embodiments of the present invention, the network interface 202 can comprise an interface suitable for connecting to other types of the access connection 104, such as, but not limited to, a wireless interface, an optical cable interface, a coaxial cable interface and the like.

The external network interface portion 200A may also comprise a control module 204, coupled to the network interface 202. The control module 204 may comprise suitable circuitry, software and/or control logic to perform one or more functions to be described in more detail herein below. Coupled to the control module 204 may be a power supply 206. How the power supply 206 is configured will be discussed in greater detail herein below. However, for the time being, suffice it to say that the purpose of the power supply 206 is to provide power to the control module 204, as well as other components of the external network interface portion 200A.

In some embodiments of the present invention, the external network interface portion 200A may comprise a modem 208. The purpose of the modem 208 is to facilitate data communication between the access network 103 and various communication entities located within the customer premises 102. In some embodiments of the present invention, the modem 208 can comprise an xDSL transceiver, which is sometimes referred to by those of skill in the art as a "DSL Modem", an "ADSL Transmission Unit—Remote" or, simply, "ATU-R". In some embodiments of the present invention, the modem 208 may be coupled to the power supply 206, however this need not be so in every embodiment of the present invention. For example, in an alternative non-limiting embodiment of the present invention, the modem 208 may be coupled to an alternative source of power. For example, in the above-mentioned scenario where the external network interface portion 200B is located inside the subscriber premises 102, the modem 208 may be coupled to the in-home electrical network (not depicted).

The external network interface portion 200A may also comprise a POTS splitter, which may be substantially similar to the POTS splitter 108 of FIGS. 1A and 1B. The POTS splitter 108 may be coupled to the network interface 202 via a line 262. In some embodiments of the present invention, the line 262 may comprise a twisted pair comprising a tip wire 262T and a ring wire 262R. In an alternative non-limiting embodiment of the present invention, the line 262 may comprise a Category 5 cable. Generally speaking, the POTS splitter 108 is operable to split the composite, full spectrum signal received from the network interface 202 to provide a voice interface and a data interface. The data interface is operable to convey the full spectrum signal, i.e. the signal having both the POTS signal and the DSL data signal to the modem 208. The voice interface is operable to convey filtered, POTS only signal. In a specific non-limiting embodiment depicted in FIG. 2A, the POTS splitter 108 may be coupled to the modem 208 via a line 260 comprising a tip wire 260T and a ring wire 260R to provide the aforementioned data interface. The POTS splitter 108 may also be coupled to the aforementioned line 109 to provide a voice interface.

In some non-limiting embodiments of the present invention, the POTS splitter 108 may be an "active filter" and, as such, may require power to perform various functions to be described herein below. In these non-limiting embodiments of the present invention, the POTS splitter 108 may be coupled to the power supply 206. In an alternative non-limiting embodiment of the present invention, the POTS splitter 108 may be coupled to the in-home electrical network (not depicted). In yet further non-limiting embodiments of the present invention, the POTS splitter 108 may be connected to another source of power (internal or external to the customer premises 102). Naturally, in other non-limiting embodiments of the present invention, the POTS splitter 108 may be a "passive splitter" and, as such, may not require power to perform various functions to be described herein below and, therefore, may not be coupled to the power supply 206.

The in-home network interface portion 200B may comprise a management module 212. The management module 212 may comprise suitable circuitry, software and/or control logic to perform one or more functions to be described in more detail herein below. The management module 212 may be in communication with the control module 204 via a line 230, which can be embodied, for example, in a serial link. The in-home network interface portion 200B may further comprise a power source 214. The power source 214 may be connectable to an in-home electrical network (not depicted) and, as such, may be configured to supply power to the components of the in-home network interface portion 200B. In some non-limiting embodiments of the present invention, the power source 214 may be coupled to the power supply 206 via a line 232. In these non-limiting embodiments, the power source 214 may be further configured to supply power to the components of the external network interface portion 200A via the power supply 206.

The in-home network interface portion 200B may further comprise an in-home data network interface 216 connectable to the aforementioned modem 208 via a line 234, which can be embodied, for example, in an Ethernet connection, a serial link and the like. In some embodiments of the present invention, the in-home data network interface 216 can be connectable to the aforementioned line 110. In some embodiments of the present invention, the in-home data network interface 216 may comprise a WiFi interface, another type of wireless interface, a cable interface, a Power Line Communication (PLC) interface or a combination thereof. One skilled in the art will appreciate, that in these various non-limiting embodiments of the present invention, the line 110 will be embodied in a corresponding type of connection. As an illustration, in the scenario where the in-home data network interface 216 is embodied in the WiFi interface, the line 110 may be embodied in a wireless link. Similarly, in a scenario where the in-home data network interface 216 is embodied in a PLC interface, the line 110 may be embodied in a portion of the in-home electrical network (not depicted).

In an alternative non-limiting embodiment of the present invention, the power source 214 and the in-home data network interface 216 can be embodied in a single Power Line Communication (PLC) interface connectable to the in-home electrical network (not depicted) for both power supply and data distribution. In some embodiments of the present invention, the line 232, the line 230 and the line 234 may be embodied in a single connection, such as, for example, a Power Line Communication connection or another suitable type of connection.

Figure 2B:
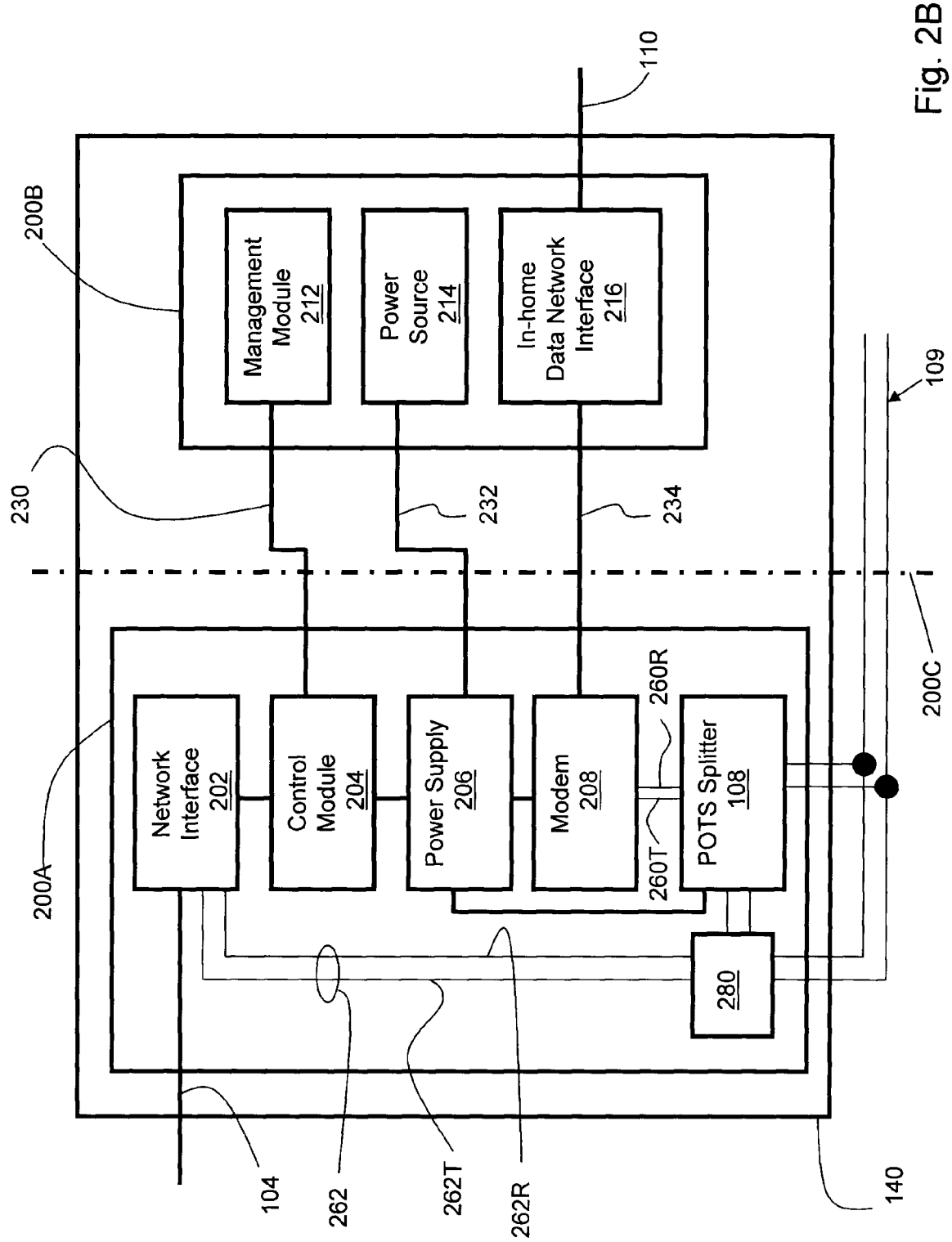
FIG. 2B is a schematic diagram representing another non-limiting embodiment of an enhanced Network Interface Device of the system of FIG. 1C.

An alternative non-limiting embodiment of the enhanced NID 140 is depicted in FIG. 2B. The enhanced NID 140 of FIG. 2B is substantially similar to the enhanced NID 140 of FIG. 2A and, as such, like elements are depicted with like numerals. In the specific non-limiting embodiment depicted in FIG. 2B, the external network interface portion 200A of the enhanced NID 140 may further comprise a bridging device 280. The bridging device 280 may be coupled to the line 262 and to the line 109. The functionality of the bridging device 280 will be described in greater detail herein below. However, for the time being suffice it to say that in some embodiments of the present invention, the bridging device 280 can be configured to selectively bridge the line 262 leading from the network interface 202 to either the POTS splitter 108 or the aforementioned line 109.

An example of the enhanced NID 140 is disclosed in a Canadian patent application entitled "METHOD, SYSTEM AND APPARATUS FOR CONTROLLING A NETWORK INTERFACE DEVICE" to Chan being filed concurrently herewith and bearing an application number 2,559,422. The content of that patent application is incorporated herein by reference in its entirety.

Figure 3:
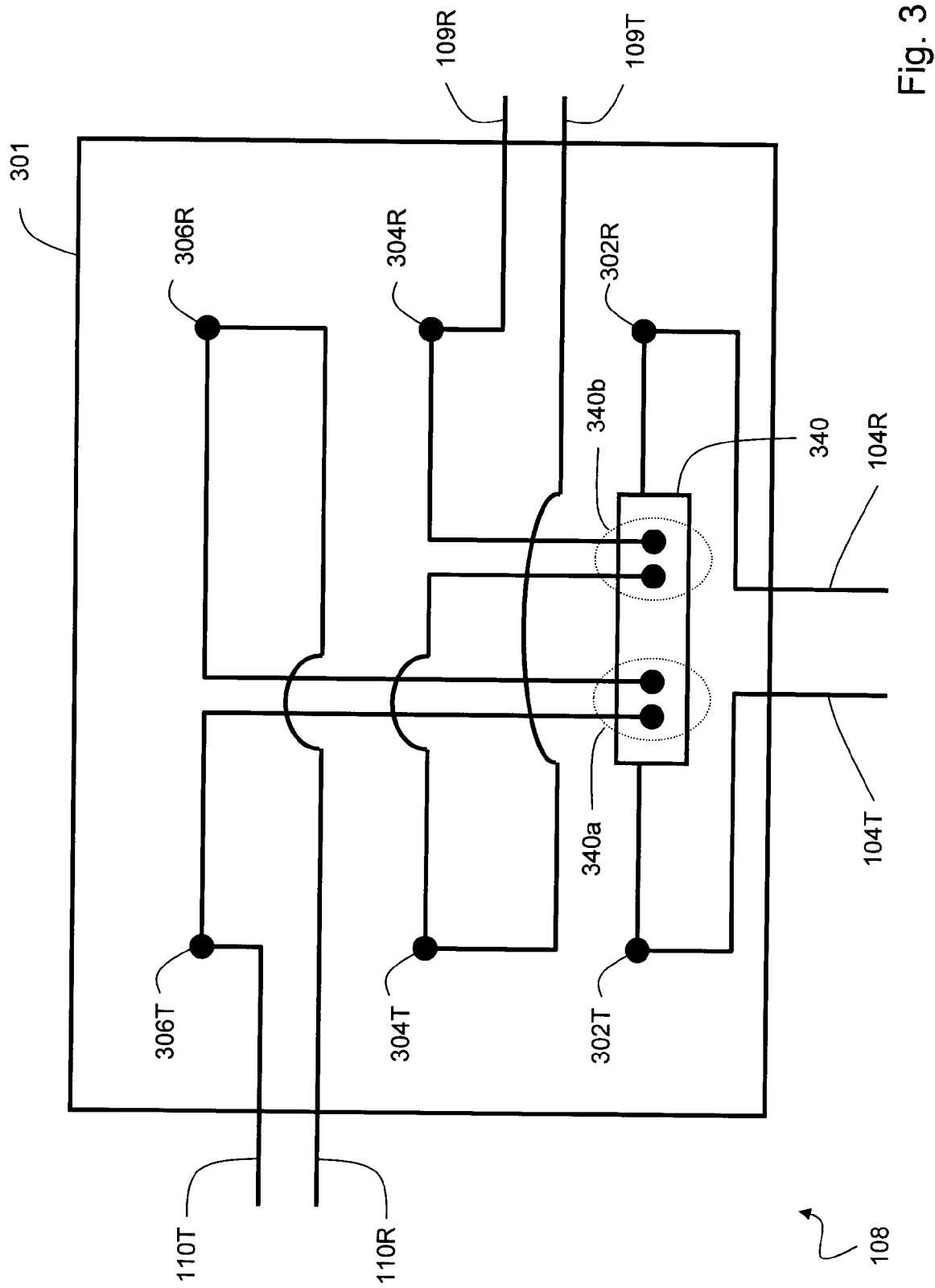
FIG. 3 is a schematic diagram depicting a POTS splitter of the systems of FIGS. 1A, 1B and 1C according to a non-limiting embodiment of the present invention.

Before describing a method for controlling the signal filtering or, in other words, the POTS splitter 108 filtering function, it is beneficial to discuss in detail the functionality of the POTS splitter 108. With reference to FIG. 3, a detailed description of the functionality of the POTS splitter 108 according to one non-limiting embodiment of the present invention will now be presented. The description of the POTS splitter 108 will be presented in the context of a non-limiting embodiment of the system 100 depicted in FIG. 1A. It is, however, expected that one of skill in the art will be able to adapt these teachings to other non-limiting embodiments of the system 100, as well as the system 100' of FIG. 1C.

The POTS splitter 108 comprises a housing 301. In some non-limiting embodiments of the present invention, the housing 301 can be made of plastic. In another non-limiting embodiment of the present invention, the housing 301 can be made of resilient moulded plastic. In yet another non-limiting embodiment of the present invention, the housing 301 can be made of metal. It should be expressly understood, that any other suitable material can be used to construct the housing 301 and that the materials used for the housing 301 should not be used as a limitation of the embodiments of the present invention.

The housing 301 comprises several line engaging elements, such as a line engaging element 302T and a line engaging element 302R for engaging a tip wire 104T and a ring wire 104R of the access connection 104. In a non-limiting embodiment of the present invention, the line engaging element 302T and the line engaging element 302R can be embodied in a female RJ-11 jack for receiving a male RJ-11 jack to which the tip wire 104T and the ring wire 104T terminate. In an alternative non-limiting embodiment of the present invention, the line engaging element 302T and the line engaging element 302R can be embodied in a female RJ-14 jack, another suitable type of an RJ jack, a female jack for receiving a male jack to which a Category 5 cable terminates and the like. In yet another non-limiting embodiment of the present invention, the line engaging element 302T and the line engaging element 302R can comprise a pair of terminals, to which the tip wire 104T and ring wire 104R can be connected by means of alligator clips, screws and the like. In alternative non-limiting embodiments of the present invention, the line engaging elements 302T, 302R can comprise an interface suitable for connecting to other types of the access connection 104, such as, but not limited to, a wireless interface, an optical cable interface, a coaxial cable interface and the like.

The housing 301 further comprises a filter circuit 340, which can comprise a low pass filter (not depicted) known to those of skill in the art. The filter circuit 340 can further comprise two interfaces—a full spectrum interface 340a and a filtered spectrum interface 340b, the filtered spectrum interface 340b being connected to the low pass filter. Connected to the filtered spectrum interface 340b can be a filtered spectrum engaging element 304T for engaging the tip wire 109T of the in-home telephone wiring and the filtered spectrum engaging element 304R for engaging the ring wire 109R of the in-home telephone wiring. In other words, the in-home telephone wiring can be embodied, for example, in the above-described line 109. In a non-limiting embodiment of the present invention, the filtered spectrum engaging element 304T and the filtered spectrum engaging element 304R can be embodied in a female RJ-11 jack to which a male RJ-11 jack to which the in-home telephone wiring (ex. the line 109) comprising the tip wire 109T and the ring wire 109R terminates. In an alternative non-limiting embodiment of the present invention, the filtered spectrum engaging element 304T and the filtered spectrum engaging element 304R can be embodied in a female RJ-14 jack, another suitable type of RJ jack, a female jack for receiving a male jack to which a Category 5 cable terminates and the like. In yet another non-limiting embodiment of the present invention, the filtered spectrum engaging element 304T and the filtered spectrum engaging element 304R can comprise a pair of terminals, to which the tip wire 109T and ring wire 109R can be connected by means of alligator clips, screws and the like.

Connected to the full spectrum interface 340a can be a full spectrum engaging element 306T for engaging the tip wire 110T of the line 110 and a full spectrum engaging element 306R for engaging the ring wire 110R of the line 110. In a non-limiting embodiment of the present invention, the full spectrum engaging element 306R and the full spectrum engaging element 306R can be embodied in a female RJ-11 jack to which a male RJ-11 jack to which the line 110 the tip wire 110T and the ring wire 110R terminates. In another non-limiting embodiment of the present invention, the full spectrum engaging element 306R and the full spectrum engaging element 306R can be embodied in a female RJ-14 jack, another suitable type of RJ jack, a female jack for receiving a male jack to which a Category 5 cable terminates and the like. In yet another non-limiting embodiment of the present invention, the full spectrum engaging element 306R and the full spectrum engaging element 306R can comprise a pair of terminals, to which the tip wire 110T and ring wire 110R can be connected by means of alligator clips, screws and the like.

In an alternative non-limiting embodiment of the present invention, the full spectrum engaging element 306R and the full spectrum engaging element 306T can be coupled directly to the line engaging element 302R and the line engaging element 302T respectively. In these non-limiting embodiments of the present invention, the full spectrum interface 340a can be omitted. In another non-limiting embodiment of the present invention, the tip wire 110T and the ring wire 1110R can be coupled directly to the network interface 202 or the tip wire 104T and the ring wire 104R outside of the POTS splitter 108 via a bridge (not depicted) or using another suitable arrangement.

An example of the POTS splitter 108 can be embodied in an xDSL POTS splitter available from Corning Inc. of One Riverfront Plaza, Corning, N.Y., USA. It should be explicitly noted that any other suitable POTS splitter having a similar or a different form factor can be used.

Figure 1C:
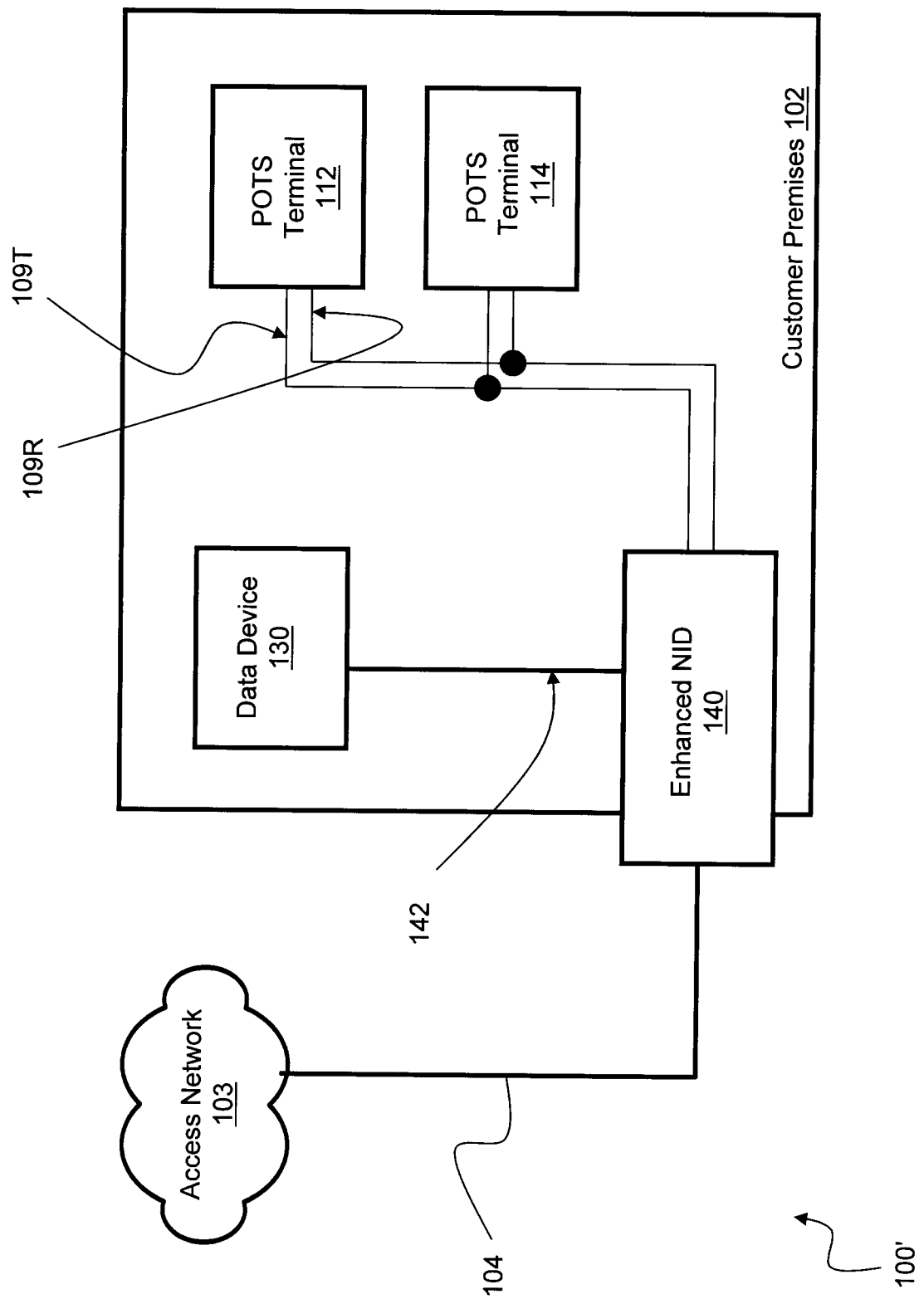
FIG. 1C is a schematic diagram representing various components of yet another non-limiting embodiment of a system for controlling POTS splitter filtering function.

Given the architecture of FIG. 1A, 1B or 1C, it is possible to receive and transmit data signals using the data device 130 via the line 110 or the data device connectable to the data network gateway 116 and the line 110. At the same time, it is possible to establish a voice call using the POTS terminals 112, 114 and the line 109, the line 109 being operable to carry lower frequency POTS signal with the higher frequency DSL data signals being filtered. Given the architecture of FIGS. 1A, 1B and 1C, the simultaneous transmission of higher frequency DSL data signals and lower frequency POTS signals is not likely to cause interference.

As has been previously mentioned, it may be desirous to nullify the filtering function of the POTS splitter 108. Just as an example and not as a limitation, a user residing at the customer premises 102 may move and a new user who moves into the customer premises 102 may wish to have the full spectrum signal having both the higher frequency DSL data signals and the POTS signal at all jacks within the customer premises 102. Several alternatives for affecting the controlling of the filtering function of the POTS splitter 108 are contemplated.

Controlling the POTS Splitter 108

Figure 4:
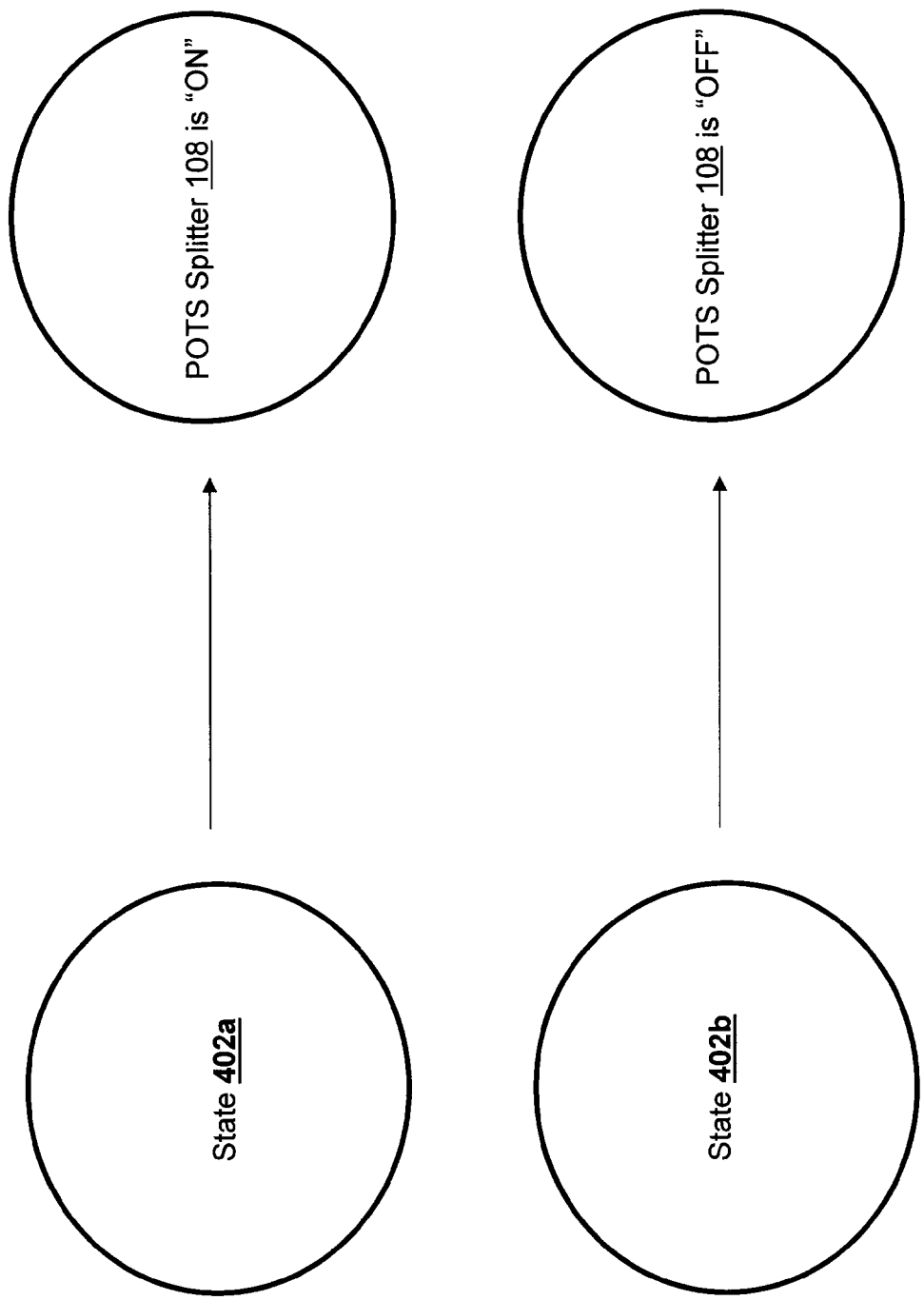
FIG. 4 is a schematic diagram representing various states that can trigger controlling the filtering function of the POTS splitter of FIG. 3 according to a first non-limiting embodiment of the present invention.

In a first non-limiting embodiment of the present invention, controlling of the filtering function of the POTS splitter 108 is affected by controlling the POTS splitter 108. It is recalled that in some non-limiting embodiments of the present invention, the POTS splitter 108 may comprise an active filter. With reference to FIG. 4, in a first non-limiting example, whether the POTS splitter 108 performs the filtering functionality is triggered on the basis of whether the enhanced NID 140 is in a state 402a or in a state 402b. The states 402a and 402 can be though of as different operational states of the enhanced NID 140. Several alternatives for causing the POTS splitter 108 to enter one of the state 402a and the state 402b are contemplated.

Receiving an ON/OFF Signal

In a first non-limiting example of this embodiment, the POTS splitter 108 can be entered into the state 402a or the state 402b based on a control signal which is operable to cause the POTS splitter 108 to be entered into one of the states 402a, 402b.

In the non-limiting embodiment depicted with reference to FIGS. 1A and 1B, the POTS splitter 108 may receive the control signal, for example, from the data network gateway 116, from a data device connected to the data network gateway 116, from another entity within the customer premises 102 or an entity outside of the customer premises 102. Based on the received signal, the POTS splitter 108 may enter the state 402a, where its filtering functionality is "ON" or, in other words, the filter within the POTS splitter 108 performs the filtering function. Alternatively, the POTS splitter 108 may enter the state 402b where its filtering functionality is "OFF" or, in other words, its filter does not perform the filtering function.

In the non-limiting embodiment depicted in FIG. 1C, the POTS splitter 108 can receive the control signal from the control module 204 of the external network interface portion 200A or from the management module 212 of the in-home network interface portion 200B. In a first non-limiting example of this embodiment, the control module 204 may generate the control signal in response to receiving a command from the management module 212 via the line 230. In a second non-limiting example of this embodiment, the control module 204 may generate the control signal itself. In this scenario, the management module 212 may be omitted altogether. Naturally, the control signal can be received from another entity, such as for example, the modem 208. As such, the control signal can be generated within the enhanced NID 108 or can be received from outside the enhanced NID, for example via the access connection 104.

Responsive to the received control signal, the POTS splitter 108 may enter into the state 402a, where it performs the filtering function or into the state 402a where it does not perform the filtering function.

Controlling Power to the POTS Splitter 108

In a second non-limiting example of this embodiment, the controlling of the POTS splitter 108 filtering function is affected by controlling power supply to the POTS splitter 108 or a portion thereof. Put another way, whether the POTS splitter 108 is in the aforementioned state 402a or state 402b is controlled by supplying power to the POTS splitter 108 or a portion thereof.

As an illustration, a non-limiting example will be presented with reference to the non-limiting embodiment depicted in FIG. 1C with reference to FIG. 2A. In this non-limiting example of this embodiment, the power supply may be controlled by coupling/de-coupling of the external network interface portion 200A to/from the in-home network interface portion 200B. It is recalled that in some non-limiting embodiments of the present invention the POTS splitter 108 may be coupled to the power supply 206, which in turn may be coupled to the power source 214 of the in-home network interface portion 200B.

In the state 402a, the in-home network interface portion 200B is coupled to the external network interface portion 200A. In other words, at least the power source 214 is coupled to the power supply 206 via the aforementioned line 232. In this arrangement, the power supply 206 receives power from the power source 214 via the line 232 and, as such, the POTS splitter 108 (as well as other components of the external network interface portion 200A) is receiving power. As such, the POTS splitter 108, which in this non-limiting embodiment comprises an active filter, will perform its filtering functionality or, in other words, its filter is "ON". Accordingly, while in the state 402a, the POTS splitter 108 will output a filtered, POTS only signal via the line 109 and the full spectrum signal (i.e. the signal comprising the POTS signal, as well as the higher-frequency DSL data signals) via the line 260.

Now, when in the state 402b, the in-home network interface portion 200B is de-coupled from the external network interface portion 200A. In other words, at least the power source 214 is de-coupled from the power supply 206. In this arrangement, the power supply 206 does not receive power from the power source 214 and, as such, the POTS splitter 108 (as well as other components of the external network interface portion 200A) is not receiving power. As such, the POTS splitter 108, which in this non-limiting embodiment comprises an active filter, is unable to perform its filtering functionality or, in other words, its filter is "OFF". Accordingly, the line 109 will effectively get the full spectrum signal (i.e. the signal comprising the POTS signal, as well as the higher-frequency DSL data signals) transmitted via the line 262.

In this non-limiting example of this embodiment, the line 232 may comprise a coupling which can selectively couple and de-couple the in-home network interface portion 200B and the external network interface portion 200A.

Accordingly, in this non-limiting embodiment of the present invention, the functionality of the POTS splitter 108 may be controlled by selectively coupling and de-coupling the in-home network interface portion 200B from the external network interface portion 200A.

A Switch

In an alternative embodiment of controlling the POTS splitter 108, the POTS splitter 108 can be controlled by a switch, which can be actuated, for example, by the user. Alternatively, the switch can be responsive to a control command, generated, for example, by the control module 204, the management module 212, the data network gateway 116, a data device connected to the data network gateway 116, the data device 130 or another entity (within or outside of the customer premises 102). As such, the POTS splitter 108 can be controlled by a mechanical or electrical switch.

In a first non-limiting example of this embodiment, the switch can control the power supply to the POTS splitter 108 or a portion thereof. In a second non-limiting example of this embodiment, the switch may generate a control signal that is operable to cause the POTS splitter 108 to enter one of the states 402*a*, 402*b*.

As a non-limiting illustration, the switch can be located in the external network portion 200 of FIG. 2A and can be configured to control supply of power from the power supply 206 to the POTS splitter 210. Alternatively, the switch can be located in the POTS splitter 108 itself and can be operable to switch OFF the POTS splitter 108 filtering functionality "ON" or "OFF".

Bypassing the POTS Splitter 108 or a Portion Thereof

In a second non-limiting embodiment of the present invention, controlling of the filtering function of the POTS splitter 108 is affected by enabling signals to bypass the POTS splitter 108 or at least the filtering functionality of the POTS splitter 108. Several alternative non-limiting embodiments are contemplated.

Figure 5:
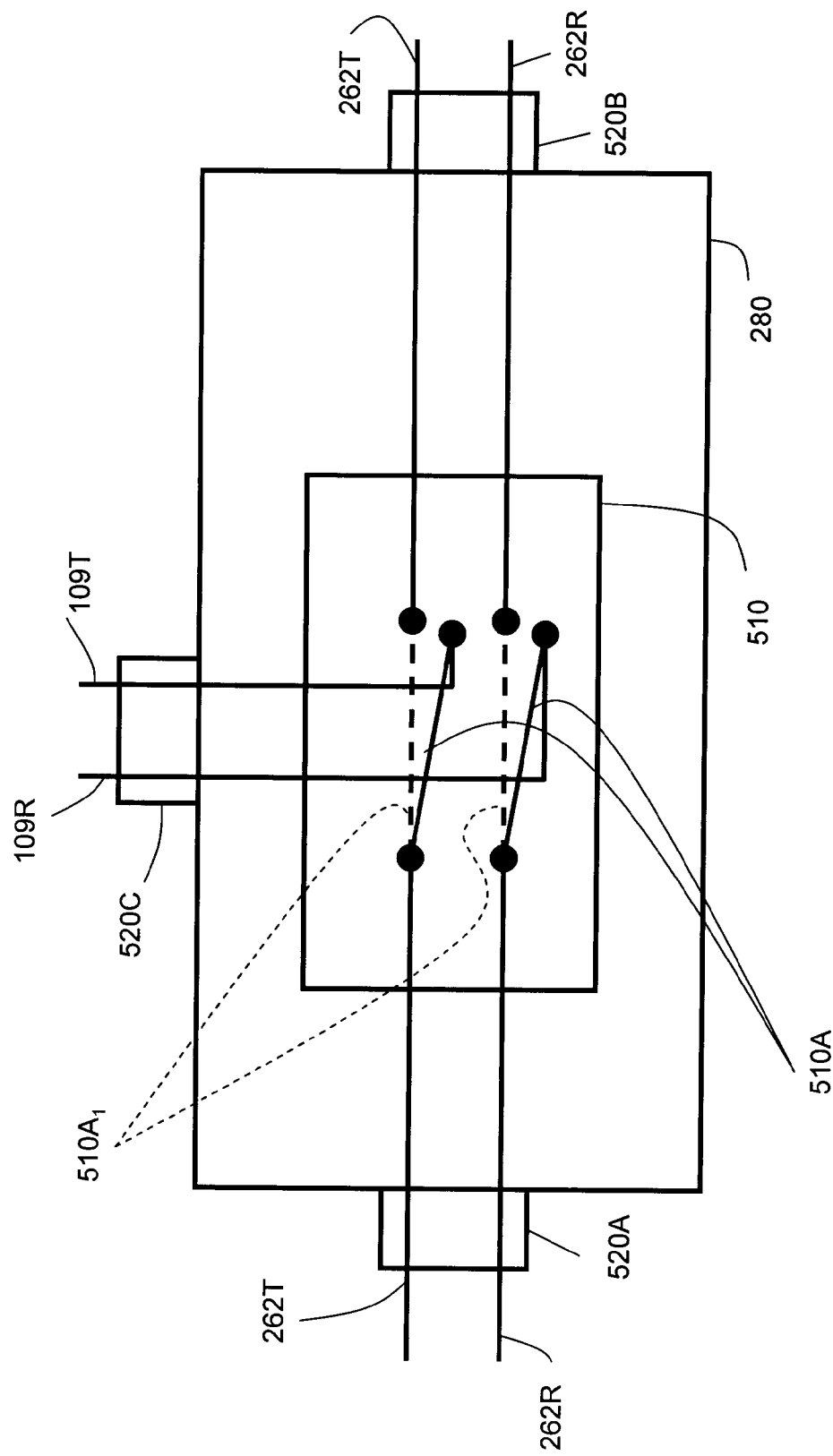
FIG. 5 is a schematic diagram representing a non-limiting embodiment of a bridging device which can be used for controlling the filtering function of the POTS splitter of FIG. 3 according to another non-limiting embodiment of the present invention.

Using the Bridging Device 280 in the External Network Interface Portion 200A It will be recalled that in the non-limiting embodiments of the present invention depicted in FIG. 2B, the external network interface portion 200A may comprise the aforementioned bridging device 280. With reference to FIG. 5 functionality of a non-limiting embodiment of the bridging device 280 in the context of controlling the filtering function of the POTS splitter 108 will now be described in greater detail. In the non-limiting embodiment depicted in FIG. 5, the bridging device 280 can comprise three interfaces—a first interface 520A, a second interface 520B and a third interface 520C. The first interface 520A can be connectable to a first portion of the aforementioned line 262 leading from the network interface 202.

In a non-limiting embodiment of the present invention, the first interface 520A can be embodied in a female RJ-11 jack to which a male RJ-11 jack to which the first portion of the line 262 comprising the first portion of the tip wire 262T and the first portion of the ring wire 262R terminates. In other non-limiting embodiments of the present invention, the first interface 520A can be embodied in a female RJ-14 jack, another suitable type of RJ jack, a female jack for receiving a male jack to which a Category 5 cable terminates and the like. In another non-limiting embodiment of the present invention, the first interface 520A can comprise a pair of terminals, to which the first portion of the tip wire 262T and the first portion of the ring wire 262R can be connected by means of alligator clips, screws and the like.

The second interface 520B can be connectable to a second portion of the line 262 leading to the POTS splitter 108. In a non-limiting embodiment of the present invention, the second interface 520B can be embodied in a female RJ-11 jack to which a male RJ-11 jack to which the second portion of the line 262 comprising the second portion of the tip wire 262T and the second portion of the ring wire 262R terminates. In other non-limiting embodiments of the present invention, the second interface 520B can be embodied in a female RJ-14 jack, another suitable type of RJ jack, a female jack for receiving a male jack to which a Category 5 cable terminates and the like. In yet another non-limiting embodiment of the present invention, the second interface 520B can comprise a pair of terminals, to which the second portion of the tip wire 262T and the second portion of ring wire 262R can be connected by means of alligator clips, screws and the like.

The third interface 520C can be connectable to the aforementioned line 109 comprising the tip wire 109T and the ring wire 109R. In a non-limiting embodiment of the present invention, the third interface 520C can be embodied in a female RJ-11 jack to which a male RJ-11 jack to which the tip wire 109T and the ring wire 109R terminates. In other non-limiting embodiments of the present invention, the third interface 520C can be embodied in a female RJ-14 jack, another suitable type of RJ jack, a female jack for receiving a male jack to which a Category 5 cable terminates and the like. In yet another non-limiting embodiment of the present invention, the third interface 520C can comprise a pair of terminals, to which the tip wire 109T and ring wire 109R can be connected by means of alligator clips, screws and the like.

The bridging device 280 can further comprise a bridging module 510. The bridging module 510 can be actuated to switch between a first position and a second position. In a first position, which can be thought of as a "disconnected position", an actuating portion 510A disconnects the first portion of the tip wire 262T from the second portion of the tip wire 109T and the first portion of the ring wire 110R from the second portion of the ring wire 109R (effectively, disconnecting the first interface 520A from the second interface 520B). At the same time, in the disconnected position the actuating portion 510A connects the first portion of the tip wire 262T to the tip wire 109T and the first portion of the ring wire 262R to the ring wire 109R (effectively, connecting the first interface 520A to the third interface 520C).

In a second position, which can be thought of as "bridged position", the first portion of the tip wire 262T is bridged to the second portion of the tip wire 262T and the first portion of the ring wire 262R is bridged to the second portion of the ring wire 262R (effectively, bridging the first interface 520A and the second interface 520B). At the same time, in the bridged position, the first portion of the tip wire 262T is disconnected from the tip wire 109T and the first portion of the ring wire 262R is disconnected from the ring wire 109R. The actuating portion 510A in the bridged position is depicted in FIG. 5 in a broken line as 510A$_1$.

How the actuating portion 510A of the bridging module 510 is moved between the bridged position and the disconnected position is not particularly limiting and several non-limiting alternatives are contemplated.

Mechanical Force

In a first non-limiting example of this embodiment, the bridging module 510 can comprise a manual switch, which can be moved between a first position and a second position by a user. When the user moves the switch between the first position and the second position, the switch can be operable to actuate the aforementioned actuating portion 510A of the bridging module 510 to change from the disconnected to the bridged position or vice versa. Now it should be explicitly understood, that the term "user" is intended to be construed broadly and to encompass someone residing or visiting the customer premises 102, a representative of a service provider associated with the access network 103 or any other suitable person that may actuate the switch.

Electromagnetic Force

In a second non-limiting example of this embodiment, the actuating portion 510A can be moved between the bridged position and the disconnected position (and vice versa) using means other than mechanical force. For example, the control module 204 may be configured to cause the actuating portion 510A to be moved between the bridged position and the disconnected position using electromagnetic force. The control module 204 may be configured to be responsive to a control signal received, for example, from the management module 212. Alternatively, the control module 204 may itself generate the control signal, for example, in response to a certain pre-determined condition being met. Naturally, the control module 204 may receive the control signal from another entity, such as, for example, the modem 208 or a data device coupled to the in-home data network interface 216 or even from the access connection 104 via the network interface 202.

It will be appreciated, that the two examples presented herein above can be combined. Consider the following non-limiting illustration. The bridging module 510 may comprise the aforementioned manual switch, which can be coupled to the control module 204. The control module 204 may be configured to detect the change in a state if the manual switch and responsive to the user changing the state of the manual switch, the control module 204 may generate the control signal which may cause the actuating portion 510A to change from the bridged position to the disconnected position (and vice versa) using, for example, electromagnetic force and the like. Alternatively, the manual switch can be located in another entity of the external network interface portion 200A or even another entity of the system 100'.

Controlling Power to the Bridging Device 280

In a third non-limiting example of this embodiment, the actuating portion 510A can be moved between the bridged position and the disconnected position (and vice versa) based on whether power is supplied to the bridging device 280 or a portion thereof. As a non-limiting illustration, when power is supplied to the bridging device 280 or a portion thereof, the actuating portion 510A can be in the disconnected position and can be maintained in the disconnected position under an electromagnetic force and the like. When the power is not supplied to the bridging device 280 or a portion thereof, the actuating portion 510A can resiliently or otherwise switch to the bridged position. How the power to the bridging device 280 or a portion thereof is controlled is not particularly limited and several non-limiting approaches for controlling power contemplated above can be used. Naturally, any other suitable approach for controlling power supply to the bridging device 280 can be used.

Naturally, other alternatives to switch the actuating portion 510A of the bridging module 510 between the bridged position and the disconnected position are possible.

Accordingly, in this non-limiting embodiment, when the actuating portion 510A of the bridging module 510 is in the bridged position, the first portion of the line 262 and the second portion of the line 262 are bridged, which effectively means that the line engaging elements 302T/302R of the POTS splitter 108 are connected to the network interface 202. Accordingly, the line 109 leading from the POTS splitter 108 will carry the filtered, POTS only signal and the line 260 leading to the modem 208 will carry the full spectrum signal (i.e. the signal comprising the POTS signal, as well as the higher frequency DSL data signal). If, on the other hand, the actuating portion 510A of the bridging module 510 is in the disconnected position, the first portion of the line 262 and the second portion of the line 262 are disconnected and the first portion of the line 262 is connected to the line 109, which effectively means that the line engaging elements 302T/302R of the POTS splitter 108 are disconnected from the network interface 202. At the same time, the line 109 is connected directly to the line 262 leading to the network interface 202. Accordingly, the line 109 will carry the full spectrum signal (i.e. the signal comprising the POTS signal, as well as the higher frequency DSL data signal that would have otherwise been filtered out).

Using the Bridging Device 280 in the POTS Splitter 108

In a second non-limiting example of how bypassing of the POTS splitter 108 can be implemented, the bridging device 280 can be located within the POTS splitter 108. In this non-limiting example, the bridging device 280 can be operable to selectively bridge the filtered spectrum engaging element 304T and the filtered spectrum engaging element 304T to one of a source of the full spectrum signal and a source of the filtered signal. As a non-limiting example, the bridging device 280 can be operable to selectively bridge the filtered spectrum engaging element 304T and the filtered spectrum engaging element 304T to one of:

a) the full spectrum interface 340a; and b) the filtered spectrum interface 340b.

In an alternative non-limiting embodiment of the present invention, the bridging device 280 can be operable to selectively bridge the filtered spectrum engaging element 304T and the filtered spectrum engaging element 304T to one of:

a) the line engaging elements 302T/302R respectively; and b) the full spectrum engaging elements 306T/306R respectively.

How the actuating portion 510 of the bridging device 280 is actuated is not particularly limited and one of the above-described non-limiting examples can be used. Naturally, other suitable approaches for actuating the actuating portion 510 are possible.

Using the Bridging Device 280 Outside the POTS Splitter 108

It should be appreciated that the bridging device 280 may be used within the system 100 of FIGS. 1A and 1B. Accordingly, in another non-limiting embodiment of the present invention, the bridging device 280 can be located outside of the POTS splitter 108 to selectively bridge a first portion of the line leading from the NID 106 (i.e. the source of the composite signal) to one of:

c) the second portion of the line leading from the NID 106 to the POTS splitter 108; and d) directly to the line 109 bypassing the second portion of the line leading from the NID 106 to the POTS splitter 108.

Figure 6A:
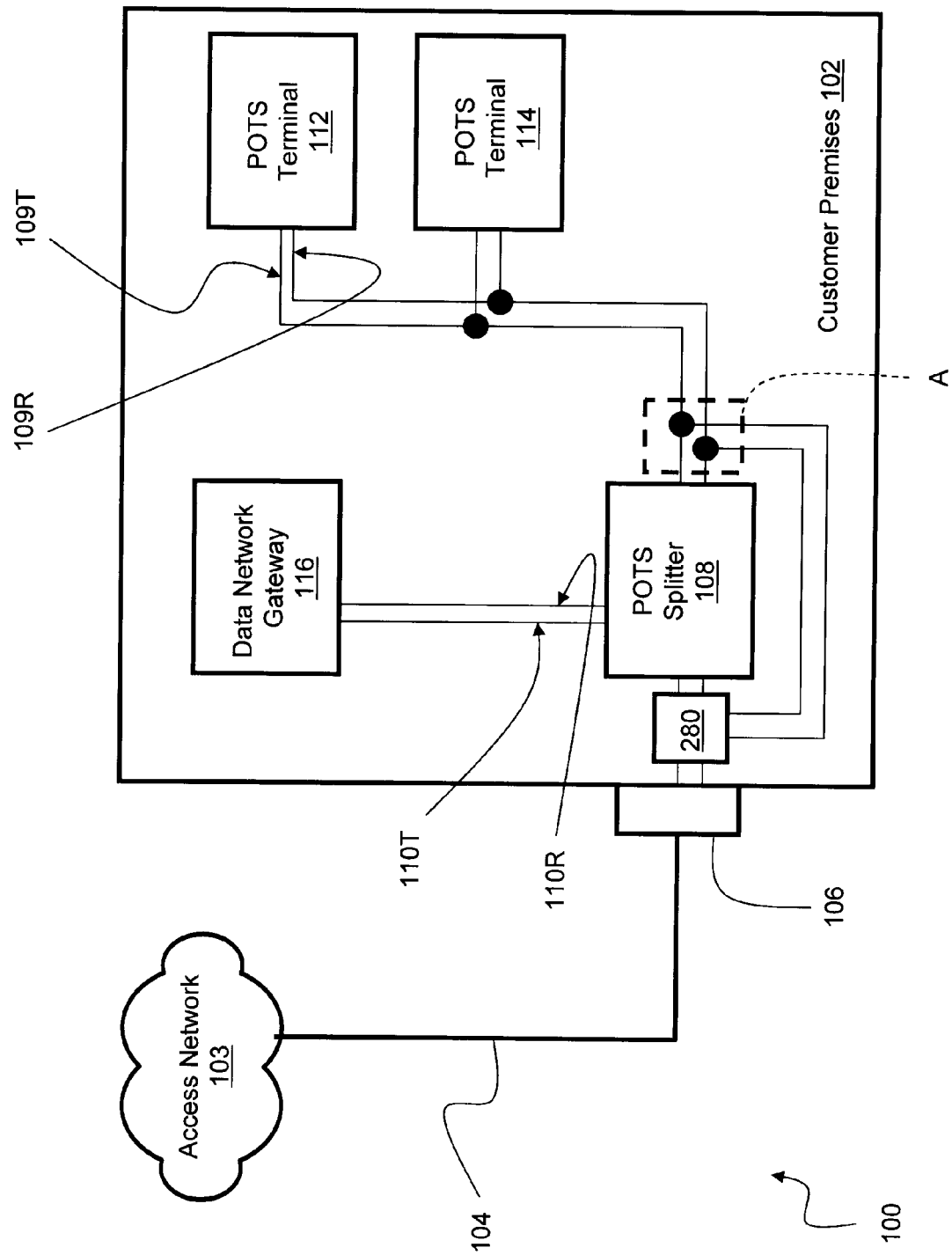
FIG. 6A is a schematic diagram representing various components of yet another non-limiting embodiment of a system for controlling POTS splitter filtering function.

An example of such non-limiting implementation is depicted in FIG. 6A, which depicts another non-limiting embodiment of the system 100. The bridging device 280 may be used to control the filtering function of the POTS splitter 108 by effectively de-coupling the POTS splitter 108 (or a portion thereof) from the source of the composite signal, i.e. from the line leading from the NID 106. Effectively, the bridging device 280 can be used to selectively couple and de-couple the POTS splitter 108 to and from the source of composite signal.

Naturally, in an alternative embodiment of the present invention, the bridging device 280 may be located elsewhere within the system 100 and still be useful in controlling the POTS splitter 108 filtering function. An example of such alternative location is depicted in FIG. 6A in a broken line as "A".

Naturally, in an alternative non-limiting implementation of this embodiment, the bridging device 280 can be located within the POTS splitter 108.

Using a Bridging Device 280'

Figure 6B:
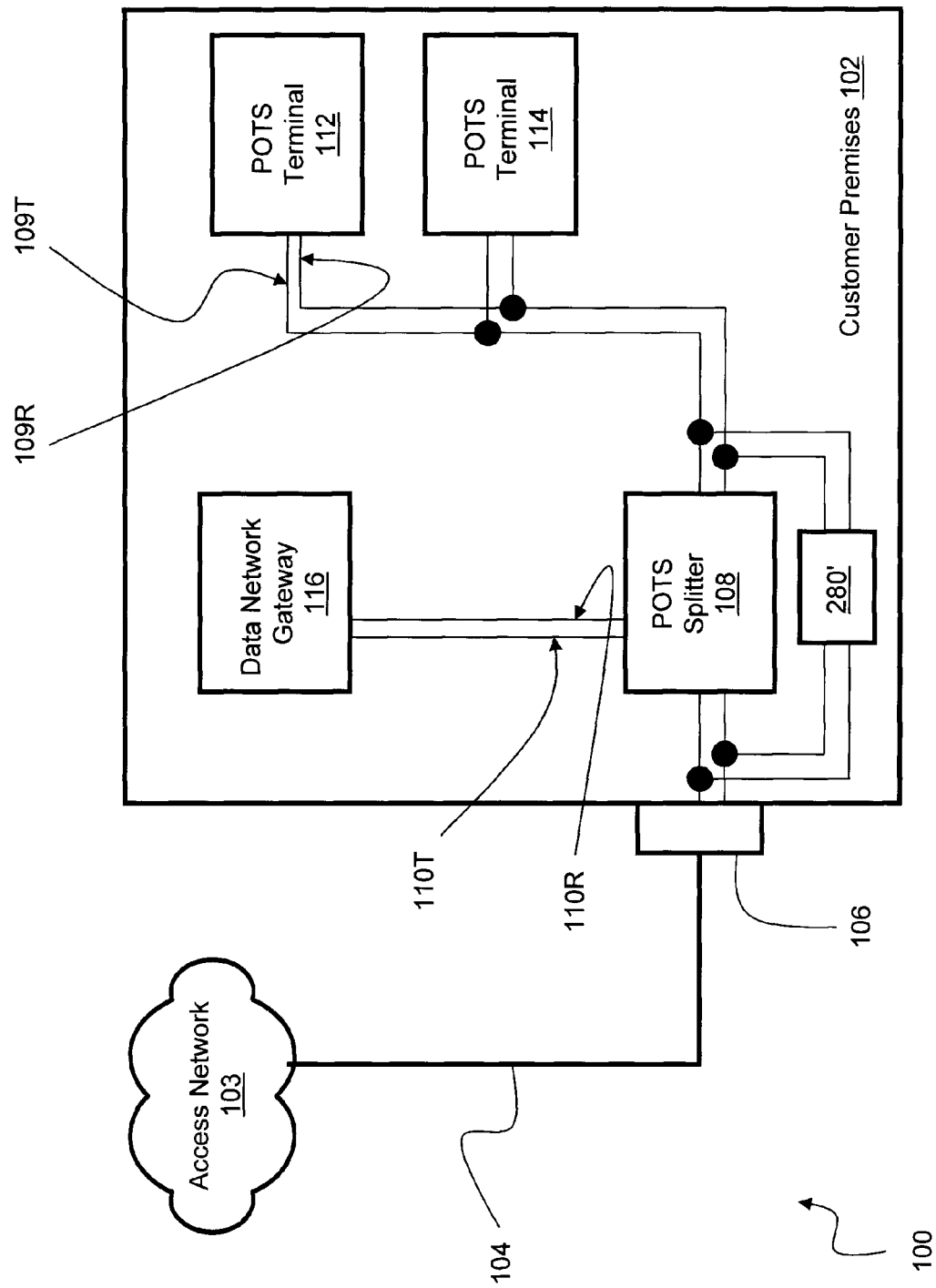
FIG. 6B is a schematic diagram representing various components of yet another non-limiting embodiment of a system for controlling POTS splitter filtering function.
Figure 7:
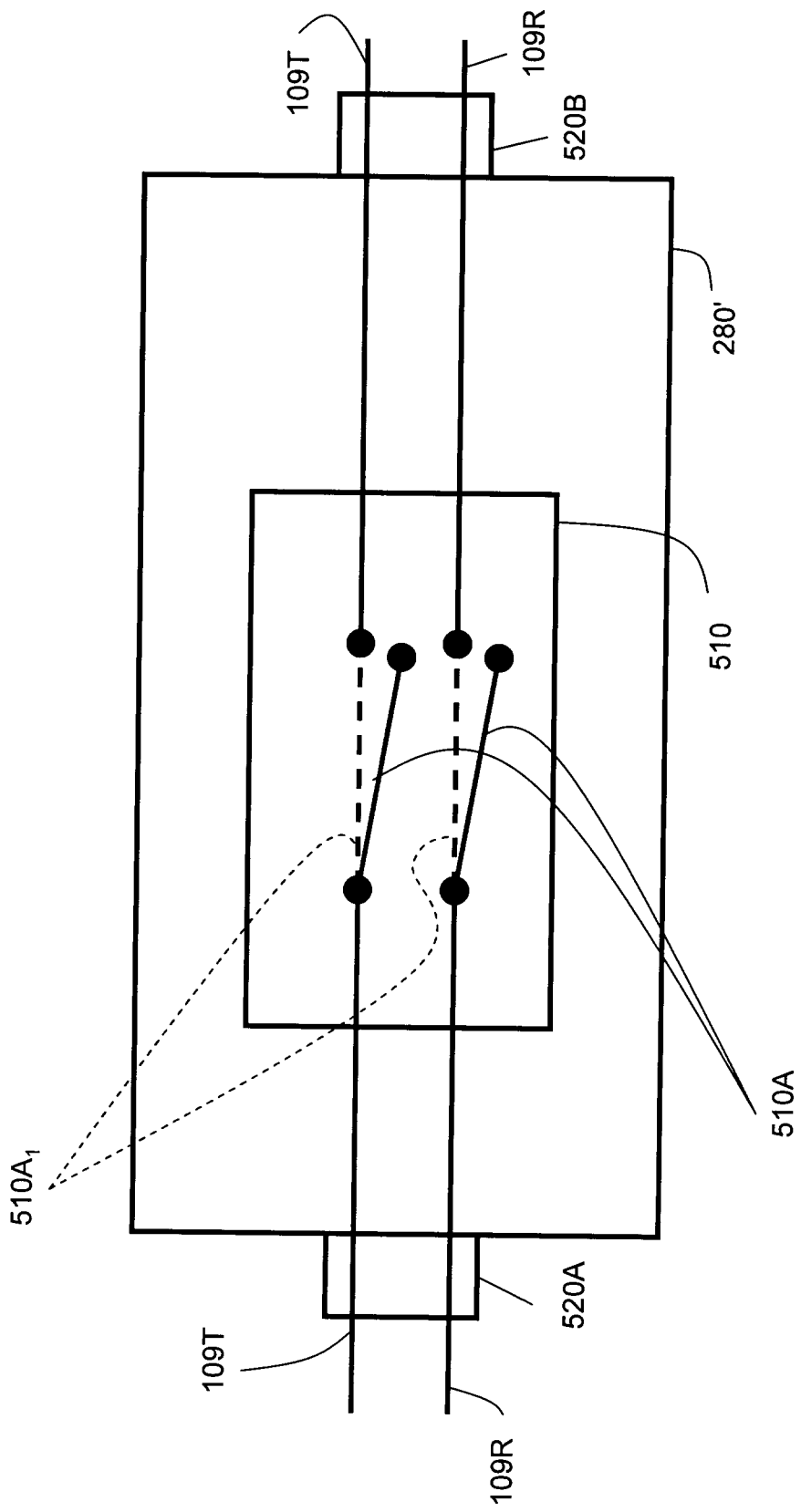
FIG. 7 is a schematic diagram depicting another non-limiting embodiment of a bridging device that can be used for controlling the POTS splitter function in a non-limiting embodiment of the system of FIG. 6B.

An alternative non-limiting embodiment of the present invention is depicted in FIG. 6B, which depicts another non-limiting embodiment of the system 100 for controlling the POTS splitter 108 filtering function. In the specific non-limiting embodiment depicted in FIG. 6B, a bridging device 280' may be used to control the filtering function of the POTS splitter 108. A non-limiting embodiment of the bridging apparatus 280' is depicted in FIG. 7. The bridging apparatus 280' is substantially similar to the bridging apparatus 280 and, as such, like elements are depicted with like numerals. However, in the specific non-limiting embodiment of FIG. 7, the bridging device 280' comprises two interfaces—the first interface 520A and the second interface 520B. With reference to FIG. 6B, the bridging device 280' may be used to enable signals arriving via the access connection 104 to selectively bypass the POTS splitter 108 (or a portion thereof, such as the filtering function).

Now, irrespective of which approach is taken to nullify the filtering function of the POTS splitter 108, when the filtering function of the POTS splitter 108 is controlled, which effectively means that the line 109 conveys the full spectrum signal, one may connect a DSL modem (similar to the modem 208) to the line 109 to establish a data communication session via the line 109. Now, if one wishes to concurrently use one of the POTS devices (such as the POTS terminals 112, 114) connected to the line 109, one will need to use a distributed POTS microfilter (not depicted) connected to each termination point along the line 109 where use of POTS devices is desired. As is known to those of skill in the art, a typical POTS microfilter comprises a low frequency pass filter and will only pass through lower frequency signals (typically, voice-band frequencies), effectively filtering out higher frequency, DSL data signals.

In an alternative non-limiting embodiment of the present invention, the controlling of the POTS splitter 108 filtering function can be implemented by permanently disabling the POTS splitter 108. For example, in some embodiments of the present invention, a signal may be transmitted to the POTS splitter 108 via the access connection 104 to permanently disable the filtering function of the POTS splitter 108, for example by "burning" the above-mentioned filter or another component of the POTS splitter 108. In an alternative non-limiting embodiment of the present invention, embodiments of the present invention can be used to trigger enablement of the filtering function of the POTS splitter 108. For example, the filtering functionality could be disabled until a customer within the customer premises 102 subscribes to a service package.

Accordingly, non-limiting embodiments of the present invention contemplate providing a triggering entity (or a triggering module), which is operable to cause controlling of the POTS splitter 108 filtering function responsive to a triggering event. Several non-limiting examples as to how the triggering entity can be implemented have been provided. As such, the triggering entity may be embodied in at least a portion of at least one of:

the bridging device 280;
the control module 204;
the power supply 206;
the POTS splitter 108;
another suitable entity of the system 100 or the system 100'.

Naturally, other variants as to how the triggering entity can be implemented are possible and are within the scope of embodiments of the present invention. Several non-limiting examples of the triggering event have been presented:

receiving a control signal;
controlling power supply;
determining that a switch has been actuated between a first position and a second position.

Naturally, other types of triggering events are also possible. Needless to say, various sub-combinations of the non-limiting embodiments of the triggering entity and various non-limiting embodiments of the triggering event are possible.

Persons skilled in the art will appreciate that there are yet more alternative implementations and modifications possible for implementing the present invention, and that the above implementations and examples are only illustrations of one or more embodiments of the present invention. The scope of the invention, therefore, is only to be limited by the claims appended hereto.

What is claimed is:

1. A selective filtering apparatus comprising:
an input interface connectable to a source of a composite signal within a first frequency range;
a filtering device, coupled to the input interface, comprising a filter and an output interface, the filter being operable to low-pass filter the composite signal and output an output signal within a second frequency range, the second frequency range being a subset of the first frequency range; the output interface being connectable to at least a portion of an in-premises telephone wiring;
a triggering module being operable to cause the output interface to selectively output one of the output signal and the composite signal;
a bridging module coupled between the input interface and the output interface; comprising:
a first interface connectable to the input interface;
a second interface connectable to the output interface; and
an actuation portion operable to selectively bridge the first interface to the second interface;
wherein to cause the output interface to selectively output one of the output signal and the composite signal, the triggering module is operable to cause the bridging module to selectively bridge the output interface to the input interface;
wherein said input interface is coupled to said output interface via a first portion of a communication line, the bridging module and a second portion of the communication line;
wherein said first interface is connectable to the first portion of the communication line; and
wherein said second interface is connectable to the second portion of the communication line.

2. The selective filtering apparatus defined in claim 1, wherein said selective filter comprises an active filter; and wherein to cause the output interface to selectively output one of the output signal and the composite signal; the triggering module is operable to control said active filter.

3. The selective filtering apparatus defined in claim 2, wherein to control said active filter, the triggering module is operable to control power to said active filter.

4. The selective filtering apparatus defined in claim 2, wherein said triggering module is operable to generate a control signal, the control signal for selectively rendering said active filter on or off.

5. The selective filtering apparatus defined in claim 2, wherein said triggering module is responsive to a control signal; and wherein said triggering event comprises the triggering module receiving the control signal.

6. The selective filtering apparatus defined in claim 2, wherein said triggering module is responsive to a switch being actuated between a first position and a second position; and wherein said triggering event comprises the switch being actuated between the first position and the second position.

7. The selective filtering apparatus defined in claim 1, further comprising a power supply for supplying power to at least the filter, wherein to cause the output interface to selectively output the composite signal, the triggering module is operable: to cause the power supply to not supply power to at least the filter so as to cause the filter to not filter the composite signal and to output the composite signal to the output interface.

8. The selective filtering apparatus defined in claim 7, wherein said triggering event comprises the triggering module receiving a control signal.

9. The selective filtering apparatus defined in claim 7, wherein said power supply is coupled to a power source; and wherein said power source is operable to supply power to the power supply when said power source is coupled to said power supply to enable the power supply to supply power to at least the filter; and wherein said triggering event comprises: said power supply being de-coupled from said power source.

10. The selective filtering apparatus defined in claim 7, wherein said triggering module is responsive to a switch being actuated between a first position and a second position; and wherein said triggering event comprises the switch being actuated between the first position and the second position.

11. The selective filtering apparatus defined in claim 1, further comprising a power supply for supplying power to at least the filter, wherein to cause the output interface to selectively output the output signal, the triggering module is operable: to cause the power supply to supply power to at least the filter so as to cause the filter to filter the composite signal and to output the output signal to the output interface.

12. The selective filtering apparatus defined in claim 1, wherein said triggering module is responsive to a switch being actuated between a first position and a second position; and wherein said triggering event comprises the switch being actuated between the first position and the second position.

13. The selective filtering apparatus defined in claim 1, wherein said triggering module comprises a switch actuatable between a first position and a second position; and wherein said triggering event comprises the switch being actuated between the first position and the second position.

14. The selective filtering apparatus defined in claim 1, wherein said triggering module is responsive to a control signal; and wherein said triggering event comprises receiving the control signal.

15. The selective filtering apparatus defined in claim 1, wherein to cause the bridging module to selectively bridge the output interface to the input interface, the triggering module is operable to control power supply to the bridging module.

16. The selective filtering apparatus defined in claim 1, wherein said communication line comprises a twisted pair; and wherein said second frequency comprises a POTS frequency.

17. The selective filtering apparatus defined in claim 1, wherein said filter comprises a first interface coupled to the input interface and a second interface coupled to the output interface; and wherein to cause the output interface to selectively output one of the output signal and the composite signal, the triggering module is operable: to cause the bridging module to selectively couple the output interface to one of the second interface of the filter and the input interface.

18. The selective filtering apparatus defined in claim 1, wherein said output interface is a first output interface; and wherein the selective filtering apparatus further comprises a second output interface for outputting the composite signal.

19. The selective filtering apparatus defined in claim 18, further comprising a modem connectable to said second output interface.

20. The selective filtering apparatus defined in claim 19, further comprising an in-premises network interface connectable to the modem; the in-premises network interface for facilitating data communication between at least one customer premises data equipment and a data network to which the input interface is connected.

21. The selective filtering apparatus defined in claim 20, wherein said in-premises network interface comprises at least one of:
   an Ethernet interface;
   a wireless interface;
   a cable interface;
   a Power Line Communication interface.

22. The selective filtering apparatus defined in claim 1, wherein said second frequency comprises a POTS frequency.

23. A selective filtering apparatus comprising:
   an input interface connectable to a source of a composite signal within a first frequency range;
   a filter coupled to the input interface, operable to filter the composite signal and to output an output signal within a second frequency range, the second frequency range being a subset of the first frequency range;
   an output interface being connectable to at least a portion of an in-premises telephone wiring;
   a bridging module coupled between the input interface and the output interface; wherein the bridging module comprises:
   a first interface connectable to the input interface;
   a second interface connectable to the output interface; and
   an actuation portion operable to selectively bridge the first interface to the second interface;
   wherein said bridging module is operable to selectively bridge the output interface to the input interface responsive to detection of a triggering event; whereby responsive to the triggering event, the output interface is operable to selectively output one of the output signal and the composite signal to the at least a portion of the in-premises telephone wiring;
   wherein said input interface is coupled to the output interface via a first portion of a communication line, the bridging module and a second portion of the communication line;
   wherein said first interface is connectable to the first portion of the communication line; and
   wherein said second interface is connectable to the second portion of the communication line.

24. The selective filtering apparatus defined in claim 23, wherein said bridging module is responsive to a switch being actuated between a first position and a second position; and wherein said triggering event comprises the switch being actuated between the first position and the second position.

25. The system defined in claim 23, wherein said bridging module comprises a switch actuatable between a first position and a second position; and wherein said triggering event comprises the switch being actuated between the first position and the second position.

26. The selective filtering apparatus defined in claim 23, wherein said bridging module is responsive to a control signal; and wherein said triggering event comprises receiving the control signal.

27. The selective filtering apparatus defined in claim 23, wherein said communication line comprises a twisted pair; and wherein said second frequency comprises a POTS frequency.

28. The selective filtering apparatus defined in claim 23, wherein said filter comprises a first interface coupled to the input interface and a second interface coupled to the output interface; and wherein the bridging module is operable:
to selectively couple the output interface to one of the second interface of the filter and the input interface.

29. The apparatus defined in claim 23, embodied in an enhanced network interface device.

30. A selective filtering apparatus comprising:
an input interface connectable to a source of a composite signal within a first frequency range;
an output interface connectable to at least a portion of an in-premises telephone wiring;
a bridging module coupled between the input interface and the output interface; wherein the bridging module comprises:
a first interface connectable to the input interface;
a second interface connectable to the output interface; and
an active filter coupled between the first interface and the second interface, the active filter being operable to low-pass filter the composite signal and to output an output signal within a second frequency range when in a first operational state and output the composite signal when in a second operational state, the second frequency range being a subset of the first frequency range;
a triggering module being operable to cause the active filter to enter one of the first and second operational states responsive to detection of a triggering event, whereby responsive to detection of the triggering event, the triggering module is operable to control the active filter to selectively output one of the output signal and the composite signal and whereby responsive to the triggering event, the output interface is operable to selectively output one of the output signal and the composite signal to the at least a portion of the in-premises telephone wiring;
wherein said input interface is coupled to the output interface via a first portion of a communication line, the bridging module and a second portion of the communication line;
wherein said first interface is connectable to the first portion of the communication line; and
wherein said second interface is connectable to the second portion of the communication line.

31. The selective filtering apparatus defined in claim 30, wherein said triggering module is responsive to a control signal; and wherein said triggering event comprises the triggering module receiving the control signal.

32. The selective filtering apparatus defined in claim 30, wherein said triggering module is responsive to a switch being actuated between a first position and a second position; and wherein said triggering event comprises the switch being actuated between the first position and the second position.

33. The selective apparatus defined in claim 30, wherein to cause the active filter to enter one of the first and second operational states, the triggering module is operable:
to transmit a control signal to the active filter, the control signal configured to cause the active filter to enter one of the first and second operational states.

34. The selective filtering apparatus defined in claim 30, further comprising a power supply for supplying power to the active filter, wherein said first operational state comprises the active filter being powered and said second operational state comprises the active filter not being powered.

35. The selective apparatus defined in claim 34, wherein to cause the active filter to enter one of the first and second operational states, the triggering module is operable:
to control whether the power supply supplies power to at least the active filter.

36. The selective filtering apparatus defined in claim 35, wherein said triggering event comprises the triggering module receiving a control signal.

37. The selective filtering apparatus defined in claim 35, wherein said power supply is coupled to a power source; and wherein said power source is operable to supply power to the power supply when said power source is coupled to said power supply to enable the power supply to supply power to at least the active filter; and wherein said triggering event comprises:
one of said power supply being de-coupled from said power source and said power supply being coupled to said power source.

38. The selective filtering apparatus defined in claim 35, wherein said triggering module is responsive to a switch being actuated between a first position and a second position; and wherein said triggering event comprises the switch being actuated between the first position and the second position.

* * * * *